(12) United States Patent  (10) Patent No.: US 8,596,707 B2
Fiander et al.  (45) Date of Patent: Dec. 3, 2013

(54) ROOF ASSEMBLY

(75) Inventors: Susanne Fiander, Dudley Park (AU); Nicholas Kebbell, Ballajura (AU)

(73) Assignee: EMU Innovations Pty Ltd, Parkwood (AU)

( * ) Notice: Subject to any disclaimer, the term of this patent is extended or adjusted under 35 U.S.C. 154(b) by 0 days.

(21) Appl. No.: 13/319,320

(22) PCT Filed: May 6, 2010

(86) PCT No.: PCT/AU2010/000528
§ 371 (c)(1),
(2), (4) Date: Feb. 21, 2012

(87) PCT Pub. No.: WO2010/127403
PCT Pub. Date: Nov. 11, 2010

(65) Prior Publication Data
US 2012/0146363 A1    Jun. 14, 2012

(30) Foreign Application Priority Data

May 6, 2009  (AU) ................................ 2009901988

(51) Int. Cl.
*B60P 3/34*  (2006.01)
(52) U.S. Cl.
USPC ...... 296/99.1; 135/88.1; 135/88.13; 135/126; 135/143
(58) Field of Classification Search
USPC ............ 296/99.1, 26.01, 26.03, 26.08, 26.11, 296/26, 12, 26.15, 160, 161, 163, 171, 173, 296/175; 135/88.1, 124–126, 128, 130, 135/131, 136, 88.13, 99, 139, 143, 158, 135/900; 52/66
See application file for complete search history.

(56) References Cited

U.S. PATENT DOCUMENTS

| | | | | |
|---|---|---|---|---|
| 1,659,825 A | * | 2/1928 | Mackay | 135/88.14 |
| 4,448,453 A | * | 5/1984 | Irelan et al. | 296/156 |
| 7,836,908 B2 | * | 11/2010 | Sy-Facunda | 135/145 |

FOREIGN PATENT DOCUMENTS

| | | |
|---|---|---|
| GB | 620764 | 3/1949 |
| GB | 2171365 A | 8/1986 |
| GB | 2436435 | 9/2007 |
| WO | WO93/04893 | 3/1993 |

OTHER PUBLICATIONS

The International Search Report for PCT/AU2010/00528; Aug. 10, 2010; 3 pages.
The International Preliminary Report on Patentability for PCT/AU2010/000528 and attached annexes; Aug. 16, 2011; 10 pages.

* cited by examiner

*Primary Examiner* — Dennis Pedder
(74) *Attorney, Agent, or Firm* — Perkins Coie LLP

(57) ABSTRACT

The present disclosure provides a roof assembly for covering a region adjacent a structure. The roof assembly comprises a plurality of roof assembly portions, each roof assembly portion comprising a layer portion and a support portion for supporting the layer portion. The roof assembly portions comprise first and second side roof assembly portions, and a corner roof assembly portion that is positioned between the first and second side roof assembly portions. The roof assembly portions are moveable between a retracted and an expanded configuration wherein the side roof assembly portions and the corner roof assembly portion move together between the configurations.

19 Claims, 26 Drawing Sheets

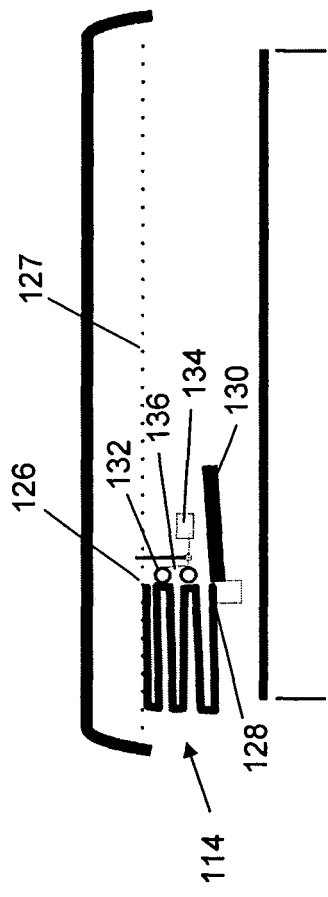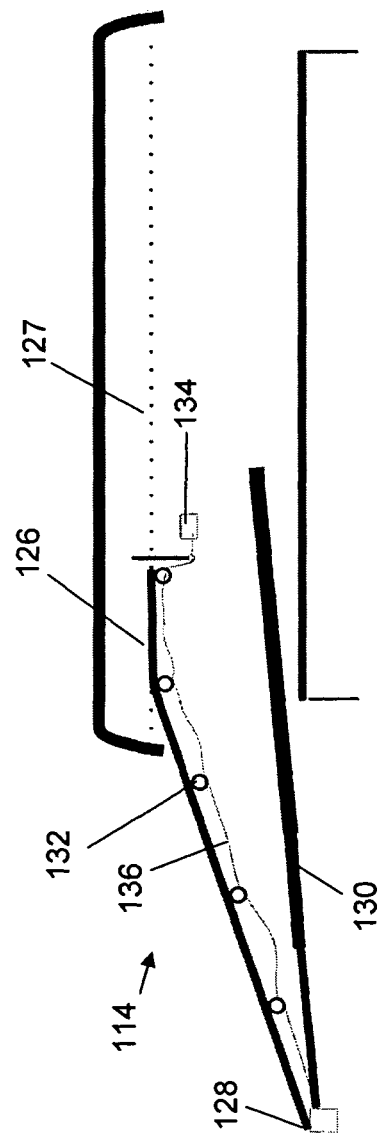

ROOF ASSEMBLY

CROSS-REFERENCE TO RELATED APPLICATIONS:

This application is a 35 USC §371 application of International Application No. PCT/AU2010/000528 filed May 6, 2010, which claims priority to Australian patent application AU2009901988 filed May 6, 2009, both of which are hereby incorporated by reference in their entirety.

FIELD OF THE INVENTION

The present invention broadly relates to a roof assembly.

BACKGROUND OF THE INVENTION

Providing shelter in a location where, for example, a first aid centre is needed has previously required that the equipment used to form the shelter be transported to the location in a container such as a shipping container. This may involve transporting the container on a truck or by airlifting the container to the location. The shelter would then be set up manually which requires a substantial amount of effort, time and manpower.

If the shelter needs to be moved again, for example if the shelter is regularly moved from location to location during a safari, emergency response or similar, the shelter will need to be dismantled, re-packed, and then transported to the next location where the shelter is set up again in the same effort and time consuming manner.

Such shelters, and in particular the containers they are transported in, are not compact and/or convenient to transport. The containers take up valuable room when in storage or in the process of transportation. Further, if the material for providing the shelter has been airlifted to a location, for example in a region where the terrain makes it difficult for a truck to transport the container, then subsequently moving the shelter to a new location will require a further airlift which is expensive and presents logistical difficulties.

In other situations, such as disaster scenarios, areas that can be used for setting up shelter and basic amenities, such as sporting ovals, may be relatively accessible. However, such shelter is often relatively basic. For example, a number of tents may be set up on an oval for providing shelter for disaster victims and/or emergency service personnel. Such tents leave a lot to be desired in the way of living conditions. Further, these tents present disadvantages regarding the effort, time and manpower required to set them up.

Accordingly, the present invention seeks to overcome at least some of the aforementioned disadvantages.

SUMMARY OF THE INVENTION

In accordance with a first aspect of the present invention there is provided a roof assembly for covering a region adjacent a structure, the roof assembly comprising:

a plurality of roof assembly portions, each roof assembly portion comprising a layer portion and a support portion for supporting the layer portion; the roof assembly portions comprising first and second side roof assembly portions and a corner roof assembly portion that is positioned between the first and second side roof assembly portions; the roof assembly portions being moveable between a retracted and an expanded configuration and arranged such that the side roof assembly portions and the corner roof assembly portion move together between the retracted and expanded configurations.

The first and second side roof assembly portions are typically positioned immediately adjacent the corner roof assembly portion.

Embodiments of the present invention provide the significant advantage that the roof assembly may expand so as to cover a region that extends around a corner of the structure in substantially one action. For example, the roof assembly may be arranged such that, as the first and second side portions of the roof assembly move from the retracted to the expanded configuration, the corner roof assembly portion expands substantially simultaneously to cover a region external the structure and extending from a corner of the structure. In one example the structure has a substantially rectangular floor plan and the first and second side roof assembly portions extend from sides that are substantially perpendicular one another so as to cover first and second regions extending from the first and second sides respectively at substantially the same time as the corner roof portion expands to cover a region between the first and second regions.

The support portions typically have first and second end-portions that are coupled to form a series of the support portions. The support portions are typically arranged such that the corner roof assembly portion moves in conjunction with the first and second side roof assembly portions as the roof assembly portions move between the retracted and the expanded configuration. The roof assembly may comprise any number of suitable side and corner roof assembly portions and may be arranged so that an outer periphery of the expanded support portions surrounds at least a portion of the structure.

The layer portions of the roof assembly portions may be joined or coupled to one other so as to provide a continuous cover supported by the support portions of the roof assembly portions. Alternatively, the layer portions may be formed from a single layer portion or may be separate portions. In each alternative, the layer portion or portions may form an annex that is extendible around the structure, for example 360° around the structure.

In general, the roof assembly may be configured such that each one of a plurality of side roof assembly portions is associated with a side of the structure and corner roof assembly portions are arranged between, and coupled to, adjacent side roof assembly portions so as to provide a continuous roof assembly having an outer periphery capable of surrounding the structure when the roof assembly portions are in the expanded configuration. In this way, when the roof assembly portions are in the expanded configuration, a continuous region surrounding the structure may be covered by the roof assembly. For example, if the structure has a substantially rectangular floor plan, the roof assembly may comprise four side roof assembly portions corresponding to each side of the structure and four corner roof assembly portions, each arranged between and coupled to a respective pair of adjacent side roof assembly portions. The roof assembly may be extendible in one action so as to cover a continuous region surrounding the structure.

In accordance with a second aspect of the present invention there is provided an expandable structure comprising a base portion, an upper portion coupled to the base portion and comprising a roof assembly, the roof assembly being in accordance with the first aspect of the present invention.

The upper portion may be moveable between a lowered configuration and a raised configuration so as to allow the expandable structure to be expandable in a substantially vertical direction. The roof assembly is moveable between a contracted and an expanded configuration so as to provide an expandable roof. The upper portion may provide cover for the expandable structure and the roof assembly may provide shelter for a region external the expandable structure when the roof assembly is in the expanded configuration. The upper portion may be arranged so as to house the roof assembly when in the contracted configuration and to which the roof assembly is attached when expanded.

Embodiments of the second aspect of the present invention provide the significant advantage of allowing the expandable structure to be relatively compact when the roof portion is lowered and the roof assembly is retracted so as to allow for convenient transport and/or storage.

For example, the expandable structure may be provided in the form of a transportable trailer that is expandable from a retracted configuration, in which the roof portion is lowered and the roof assembly is retracted, to an expanded configuration, in which the roof portion is raised and the roof assembly is expanded. In one example, the expandable structure may be arranged for transportation to a remote location at which the expandable structure may expanded so as to provide a conveniently transportable shelter.

The following will describe features that relate to embodiments of each of the first and second aspects of the present invention.

The support portion of the first and second side roof assembly portions may comprise elongate members that extend substantially along the respective side roof assembly portions. In one example, each elongate member comprises a series of member portions.

The elongate member of the corner roof assembly portion may be a foldable member having a first coupling coupled to an end of the elongate member of the first side roof assembly portion and a second coupling coupled to an end of the elongate member of the second side roof assembly portion so as to allow the corner roof assembly portion to move in conjunction with the first and second side roof assembly portions.

The foldable member of the corner roof assembly portion may comprise a plurality of elongate support elements sequentially coupled to one another in a manner such that, when the corner roof assembly portion is in the retracted configuration, at least a portion of the support structure is folded about a coupling between the support elements.

In an alternative embodiment, the elongate support elements of the corner roof assembly portion are foldable in a concertina or zigzag like manner as the corner roof assembly portion moves to the retracted configuration.

The roof assembly may comprise telescopic members that are coupled either directly or indirectly to respective elongate members so that, as the telescopic members move, the elongate members move in a manner such that the roof assembly moves between the retracted and expanded configurations.

The layer portions may comprise a material having sufficient flexibility to fold when the roof assembly moves to the retracted configuration.

The layer portions may comprise a polymeric material. The polymeric material may comprise a polyster material coated with a polyvinyl chloride (PVC) and/or a polyvinylidene fluoride (PVDF) material.

In one embodiment, the layer portions comprise a polyester woven scrim core sandwiched between PVC layers, the polyester scrim and PVC layers being sandwiched between acrylic lacquer layers. The layer portion may further comprise a top layer of PVDF lacquer layer and a further fluorine lacquer layer.

The roof assembly may further comprise additional roof portions and/or wall portions that are arranged for coupling to the roof assembly when in the expanded configuration. For example, the roof assembly may form a base to which the additional roof portions may be coupled so as to extend an amount of coverage provided. The structure may be coupled to the additional roof portions, or the roof assembly, so as to provide a wall portion that is spaced from the wall portions of the structure. This provides the significant advantage of providing a shelter that may be set up quickly and conveniently. After the roof assembly has been moved into the expanded configuration, typically in one action, the additional roof portions and/or wall portions may be added to expand the shelter. The initial expansion of the roof assembly may provide shelter while the additional roof portions and/or wall portions are being added.

In one embodiment, the additional roof and/or wall portions are housed in respective side and corner roof assembly portions, wherein the side and corner roof assembly portions comprise extendable support legs that may be extended from the side and corner roof portions to provide a frame for additional layer portions. The additional layer portions may be attached to the extendable support legs such that the layer portions unfold as the extendable support legs extend.

The extendable support legs may be telescopically extendable, or they may be extendable by unfolding.

The additional layer portions may house further material for closing openings formed by the deployment of the extendable support legs and the additional layer portions.

The structure may be a vehicle such as a recreational vehicle trailer or a caravan. Alternatively, the structure may be a fixed structure or a semi-permanent structure such as a demountable structure.

In accordance with a third aspect of the present invention, there is provided a vehicle comprising a vehicle body coupled to a roof assembly, the roof assembly being arranged to be moveable between a retracted and an expanded configuration such that, when the roof assembly is in the expanded configuration, an outer periphery of the roof portion surrounds at least a portion of the vehicle.

Further, the vehicle may comprise an upper portion comprising the roof assembly portion, and the upper portion may be moveable between a lowered and a raised configuration.

The roof assembly of the third aspect of the invention may be provided in accordance with the first aspect of the invention.

The invention will be more fully understood from the following description of specific embodiments of the invention. The description is provided with reference to the accompanying drawings.

BRIEF DESCRIPTION OF THE DRAWINGS

FIG. 10a is a partial cross sectional view of the alternative roof assembly of FIG. 9a showing the alternative roof assembly in a retracted configuration;

FIG. 10b is a partial cross sectional view of the alternative roof assembly of FIG. 9e showing the alternative roof assembly in an expanded configuration.

DETAILED DESCRIPTION OF THE SPECIFIC EMBODIMENTS

Specific embodiments of the present invention are now described with reference to FIGS. 1-8 in relation to a roof assembly for covering a region adjacent a structure.

Figure 1:
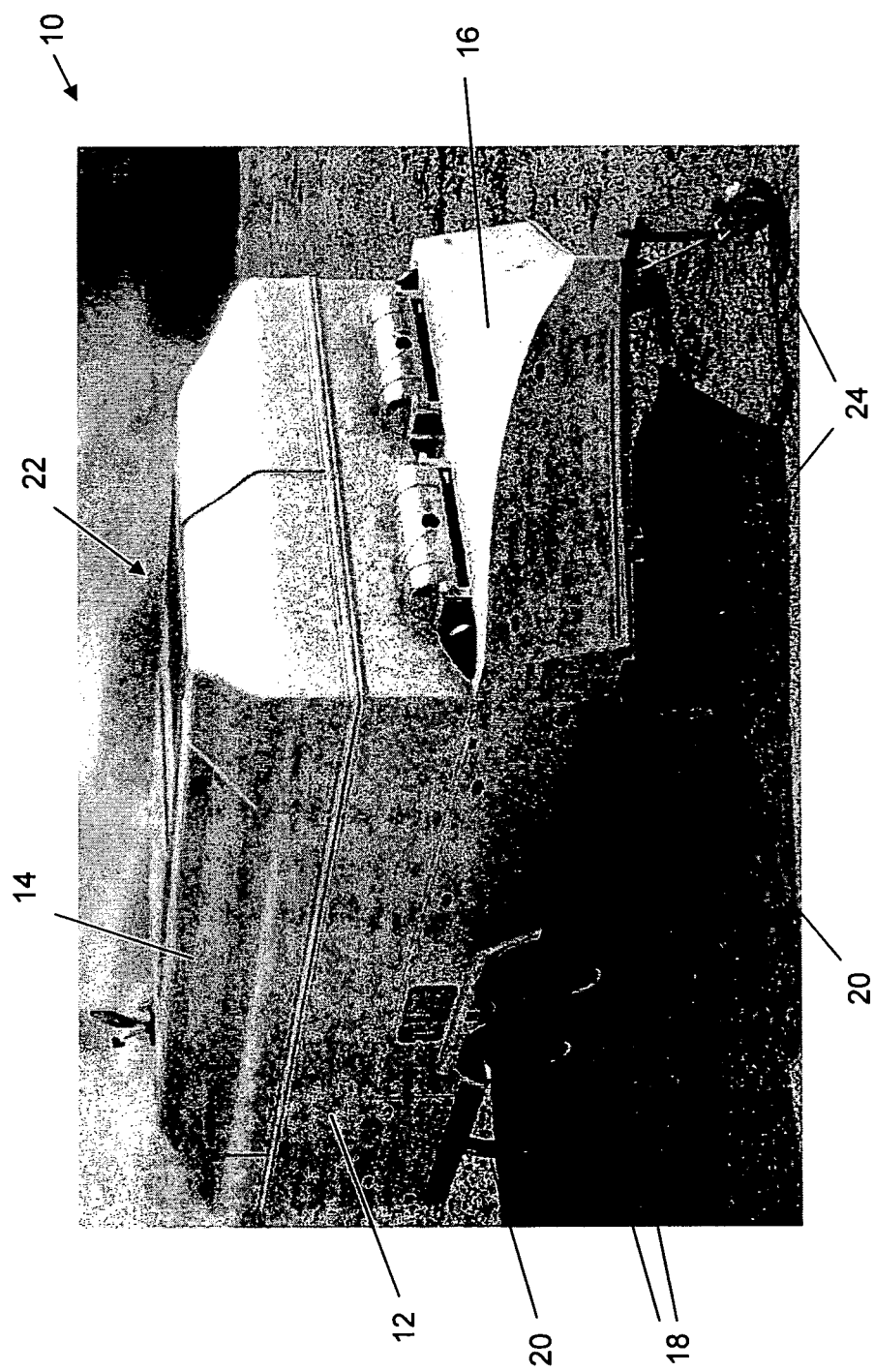
FIG. 1 is a perspective view of a trailer in accordance with an embodiment of the present invention.

Referring initially to FIG. 1, there is shown a trailer 10 comprising a base portion 12, an upper portion 14 and a detachable generator 16. The base portion 12 comprises wheels 18 to enable convenient transport of the trailer 10 and retractable support members 20 for stabilizing the trailer 10 in position. The upper portion 14 houses a roof assembly, which is shown and described later, and provides an upper surface 22 for mounting or installing peripherals such as satellite dishes, solar panels, ventilation systems and other attachments and systems. The generator 16 is detachable from the base portion 12 and comprises retractable wheels 24. The retractable wheels 24 may be retracted when the trailer 10 is being transported, for example by attachment to a land vehicle, or may be in a lowered configuration as shown in FIG. 1 when the trailer is in position. Accordingly, the generator 16 may be moved away from the base portion 12 when the retractable wheels 24 are lowered.

Figure 2A:
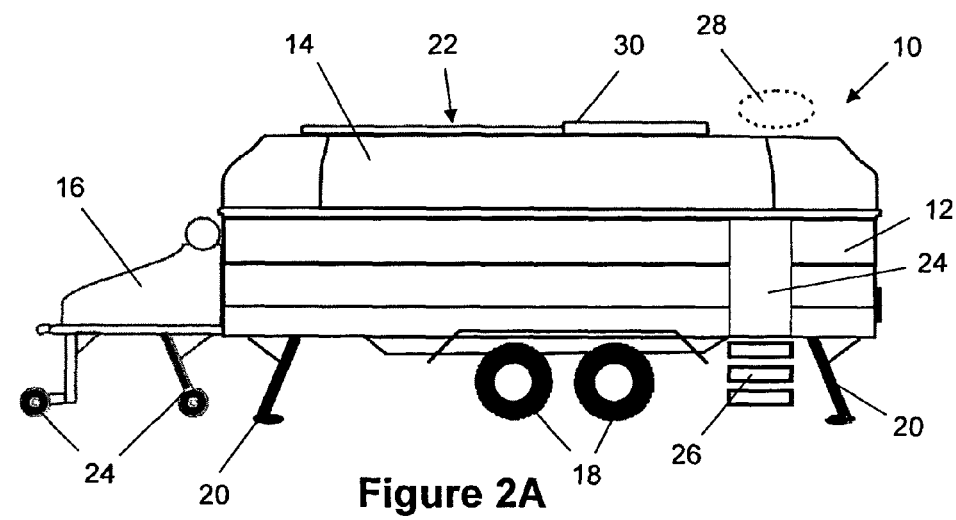
FIG. 2a is a side elevation of the trailer of FIG. 1.
Figure 2B:
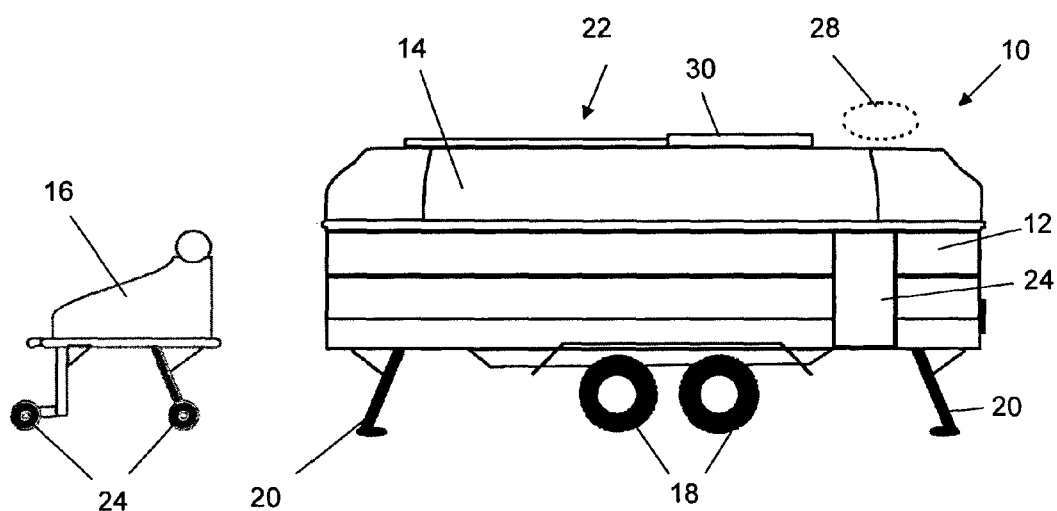
FIG. 2b is a side elevation of the trailer of FIG. 1 showing a generator in a detached configuration from a base portion.

Referring now to FIG. 2A, there is shown a side elevation of the trailer 10 showing the base portion 12 comprising a door 24 and retractable stairs 26 leading from the door 24. In FIG. 2a the retractable stairs 26 are in a lowered configuration. Referring now to FIG. 2B, the trailer 10 is shown wherein the generator 16 has been detached from the base portion 12 and the stairs 26 are in a retracted configuration (not shown). Also shown in FIG. 2 is a satellite dish 28 arranged on the upper surface 22 of the upper portion 14 and a slideable cover 30 shown in a second position corresponding to FIG. 3B. In FIGS. 2A and 2B, the upper portion 14 is shown in a lowered configuration.

Figure 3A:
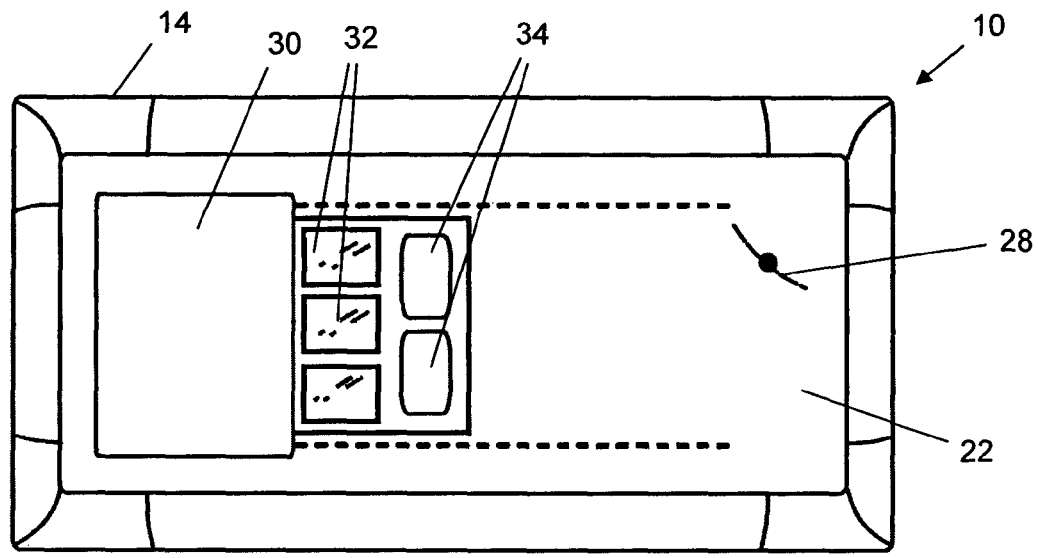
FIG. 3a is a top view of the trailer of FIG. 1 showing a sliding panel in a first position.
Figure 3B:
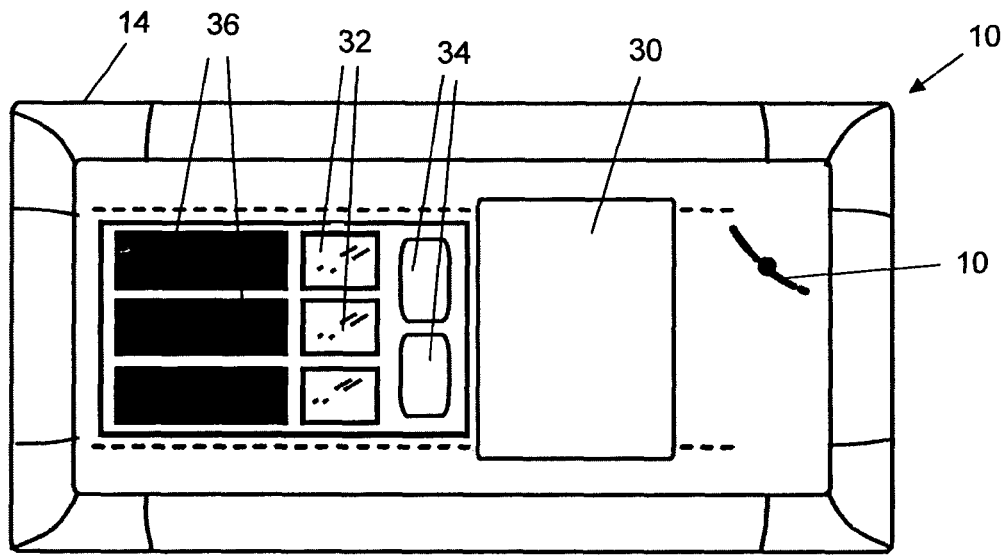
FIG. 3b is a top view of the trailer of FIG. 1 showing the sliding panel in a second position.

Referring now to FIG. 3A there is shown a top view of the trailer 10 showing the upper portion 14 comprising an upper surface 22 with a satellite dish 28, skylights 32, extractor fans 34 and the slideable cover 30 arranged thereon. In FIG. 3A the slideable cover 30 shown in a first position covering a set of solar panels 36 which are shown in FIG. 3B. In FIG. 3B, the slideable 30 is shown in a second position exposing the solar panels 36.

Figure 4:
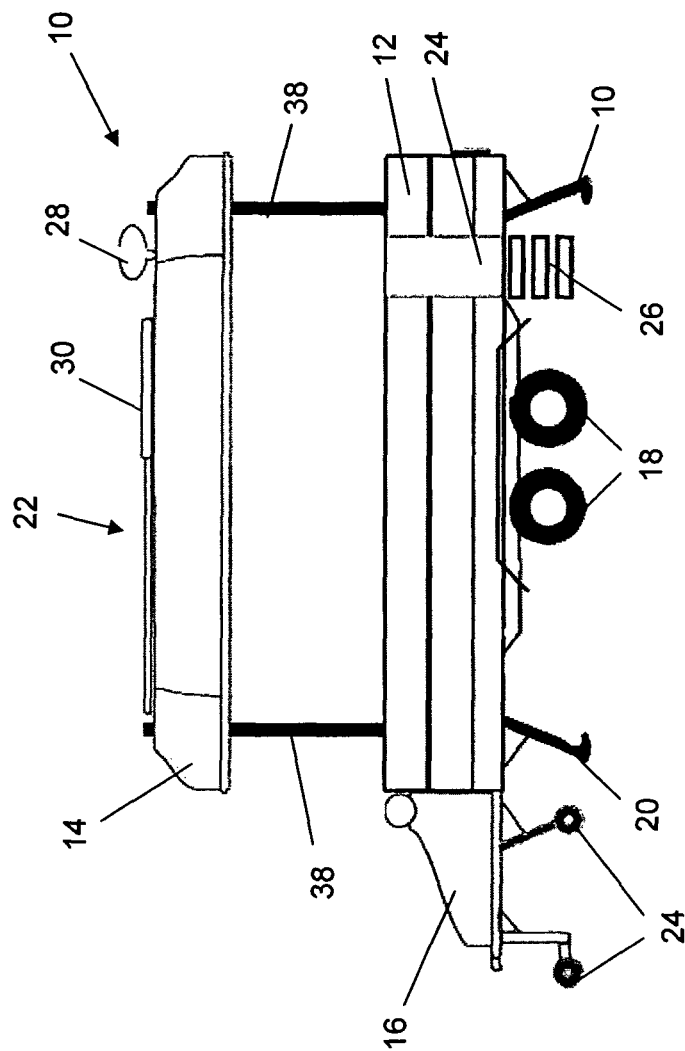
FIG. 4 is a side elevation of the trailer of FIG. 1 showing an upper portion in a raised configuration.

Referring now to FIG. 4, there is shown a side elevation of the trailer 10 with the upper portion 14 shown in a raised configuration. The roof portion 14 is supported by extendable support members 38 which extend between the body portion 12 and the roof portion 14. The extendable support members 38 may be extendable by means of a hydraulic system or other mechanical means arranged to allow extension of the extendable support members 38.

In general, when the trailer 10 is arranged such that the upper portion 14 is in the raised configuration shown in FIG. 4, the roof assembly may then move from a retracted configuration to an expanded configuration. In this manner, the trailer 10 may be conveniently transported to a location after which the upper portion 14 is raised and subsequently the roof assembly is expanded. The trailer 10 may therefore move from a compact configuration to an expanded configuration wherein shelter is provided around a region of the trailer 10.

Figure 5A:
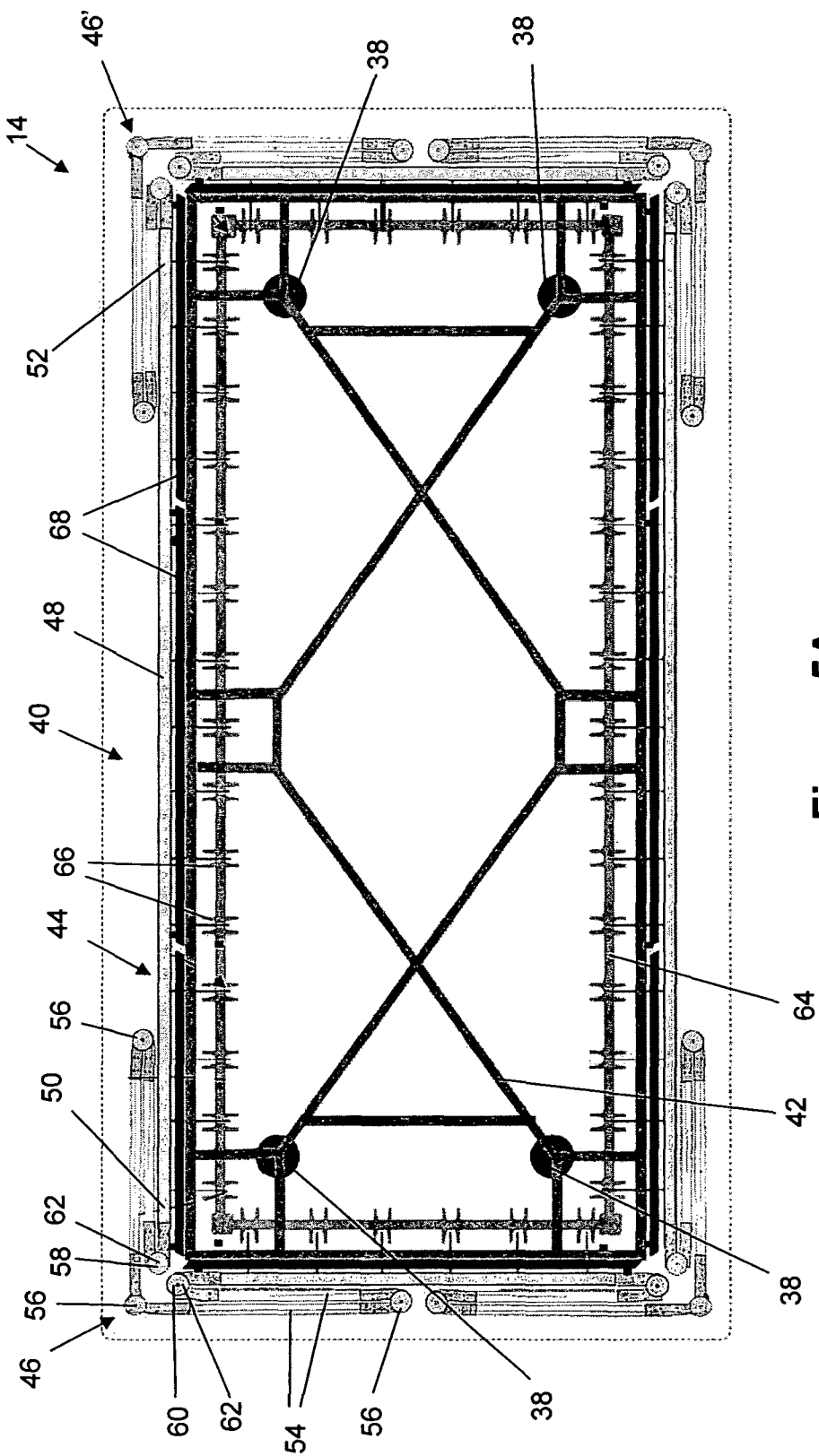
FIG. 5a is a cutaway top view of the trailer of FIG. 1 showing a roof assembly in a retracted configuration.

FIGS. 5A-5D describe an embodiment wherein the roof assembly moves from a retracted configuration to an expanded configuration. Referring initially to FIG. 5A, a cutaway top view of the upper portion 14 shows a roof assembly 40 supported by a support frame 42. The support frame 42 is supported by the extendable support members 38 which, as shown in FIG. 5A, are each arranged substantially towards a respective corner of the upper portion 14. Accordingly, there is provided a total of four extendable members 38. The roof assembly 40 comprises four side roof assembly portions 44 which are associated with each side of the roof portion 14. Arranged and coupled between adjacent side roof assembly portions 44 are corner roof assembly portions 46. Each side roof assembly portion 44 comprises an elongate support member 48 having a first end 50 coupled to a corner roof assembly portion 46 and having a second end 52 coupled to a further corner roof assembly portion 46'. Each corner roof assembly portion 46 comprises a plurality of elongate support members 54 sequentially coupled to one another by a spring loaded hinge assembly 56. Each spring loaded hinge assembly 56 may be a spring tensioned knuckle joint hinge mechanism. A first coupling 58 of the corner roof assembly portion 46 is coupled to an adjacent side roof assembly portion by means of a free swing hinge assembly 62 and a second coupling 60 of the corner roof assembly portion 46 is coupled to a further adjacent side roof assembly portion 44 by means of a further free swing hinge assembly 62. Each free swing hinge assembly 62 may be a knuckle joint hinge mechanism. It will be appreciated that any appropriate hinge or joint may be used to effect the coupling between adjacent arms/portions etc.

Figure 5B:
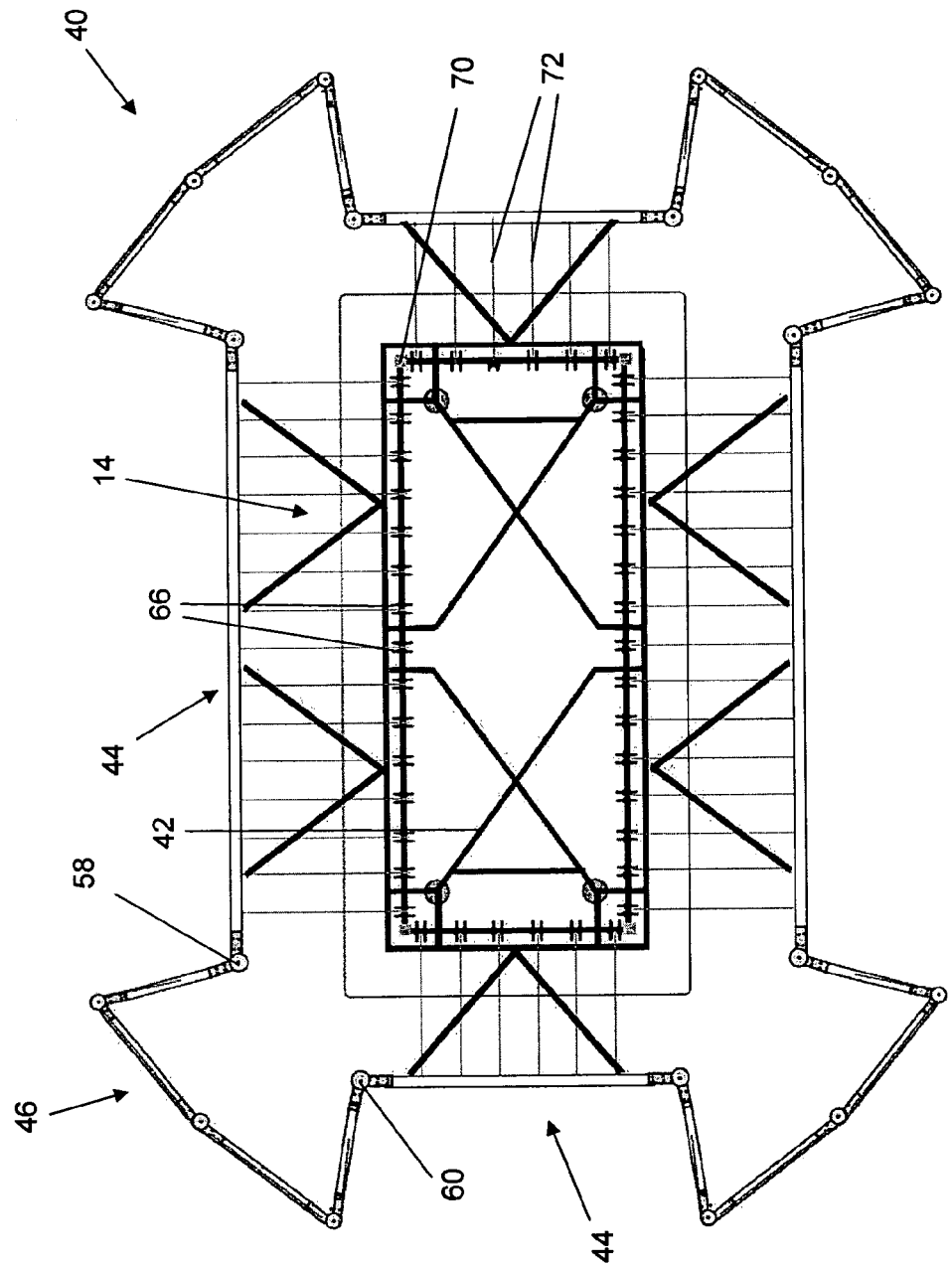
FIG. 5b is a cutaway top view of the trailer of FIG. 1 showing the roof assembly in a partially expanded configuration.

Further supported by the support frame 42 is a sub frame 64 which comprises a plurality of cable winders for releasing or winding up cable when the roof assembly 40 moves between the retracted configuration and the expanded configuration. The cable is attached to a fabric or other material that may form a layer portion for providing shelter when the roof assembly 40 is expanded. In this way, the layer portion may be unfolded or otherwise expanded as the roof assembly 40 also expands with the cable acting as a guide for the unfolding or expansion of the layer portion. Each side roof assembly portion 44 is coupled to the support frame 42 by a plurality of telescopic arms 68. The telescopic arms 68 move outwardly from the support frame 42 as the roof assembly moves from the retracted to the expanded configuration as shown in FIG. 5B. The telescopic arms 68 may be spring loaded to allow them to move outwardly from the support frame 42, or they may be urged outwardly by hydraulic means or some other mechanical system.

FIG. 5B shows the roof assembly 40 is a partially expanded configuration as it moves between the retracted configuration and the expanded configuration. Compared to FIG. 5A, the roof assembly 40 has moved away from the support frame 42. In particular, each side roof assembly portion 44 is shown to be moving away from its associated side of the roof portion 14 and each corner roof assembly portion 46 is shown to be unfolding as the first and second couplings 58, 60 of the corner roof assembly portion 46 are moving in conjunction with their associated side roof assembly portions 44. The force required to move the side roof assembly portions 44 in a direction away from their associated sides may be provided by a spider gearbox with a motor 70 and/or a backup hand winch. Also shown in FIG. 5B is the unwinding of a plurality of cables 72, each associated with a respective roof cable winder 66. Accordingly, the layer portion (not shown) will be unfolding from the upper portion 14 in the direction of movement of the side and corner roof assembly portions 44, 46.

Figure 5C:
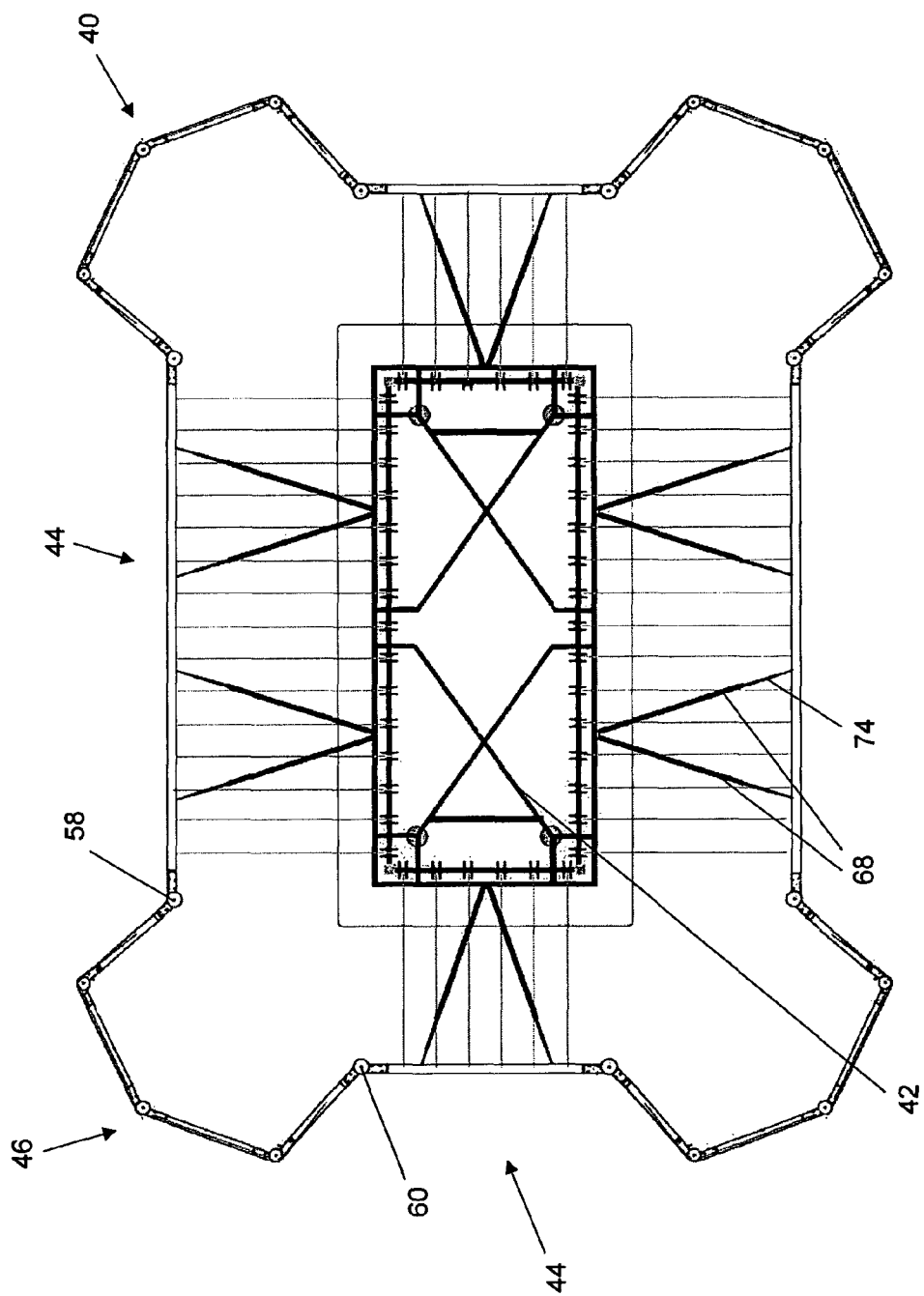
FIG. 5c is a cutaway top view of the trailer of FIG. 1 showing the roof assembly in a partially expanded configuration.

Referring now to FIG. 5C, there is shown the roof assembly 40 in a further partially expanded configuration. In this example the roof assembly is further expanded compared to that shown in FIG. 5B. As each side roof assembly portion 44 moves further away from its respective side, corresponding telescopic arms 68 extend by means of a telescopically extendable member 74. Each telescopically extendable member 74 may be spring loaded so as to make them extendable. Alternatively, each telescopically extendable member 74 may be extendable by hydraulic means or some other mechanical system. Further shown in FIG. 5C is the continuing expansion of each corner roof assembly portion 46 as the first and second couplings 58, 60 of each corner roof assembly portion 46 move further away from the support structure 42 in conjunction with each side roof assembly roof portion 44.

Figure 5D:
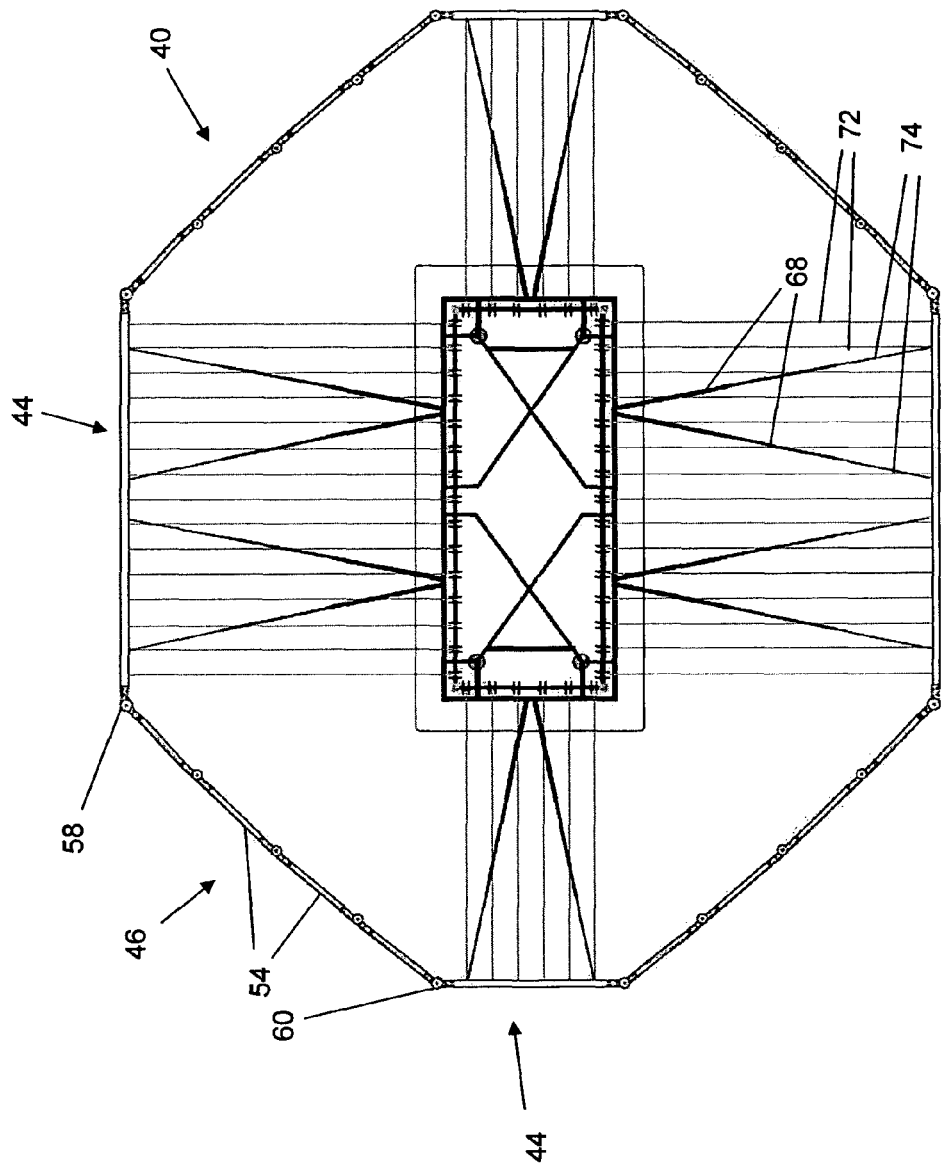
FIG. 5d is a cutaway top view of the trailer of FIG. 1 showing the roof assembly in an expanded configuration.

Referring now to FIG. 5D the roof assembly 40 is shown in a fully expanded configuration in this example it can be seen that each side roof assembly portion 44 has moved further away from each side and accordingly each first and second coupling 58, 60 of each corner roof assembly portion 46 has moved in conjunction with the respective side roof assembly portion 44 that it has been coupled with to the extent that the elongate support members 54 are in a substantially linear orientation relative one another. Also shown is the further extension of each telescopic arm 68 and its corresponding telescopically extendable member 74 along with the further extension of each roof cable 72.

It will be appreciated that although the above FIGS. 5A through 5D have not shown the fabric or layer portion, the fabric or layer portion will have moved outwardly from the support frame 42 in conjunction with the side roof assembly portions 44 and corner roof assembly portions 46. The layer portion will have been guided by the roof cables 72 so as to assist with the unfolding of the layer portion.

Figure 6A:
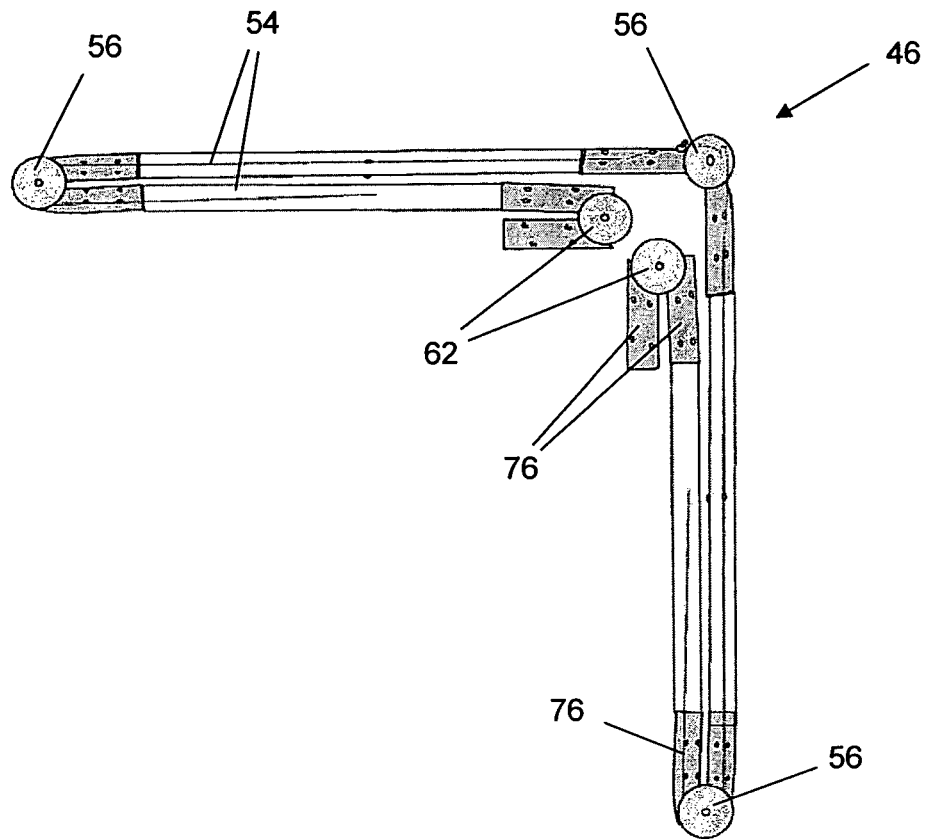
FIG. 6a is a top view of a roof assembly corner portion of the roof assembly of FIG. 5 shown in a retracted configuration.
Figure 6B:
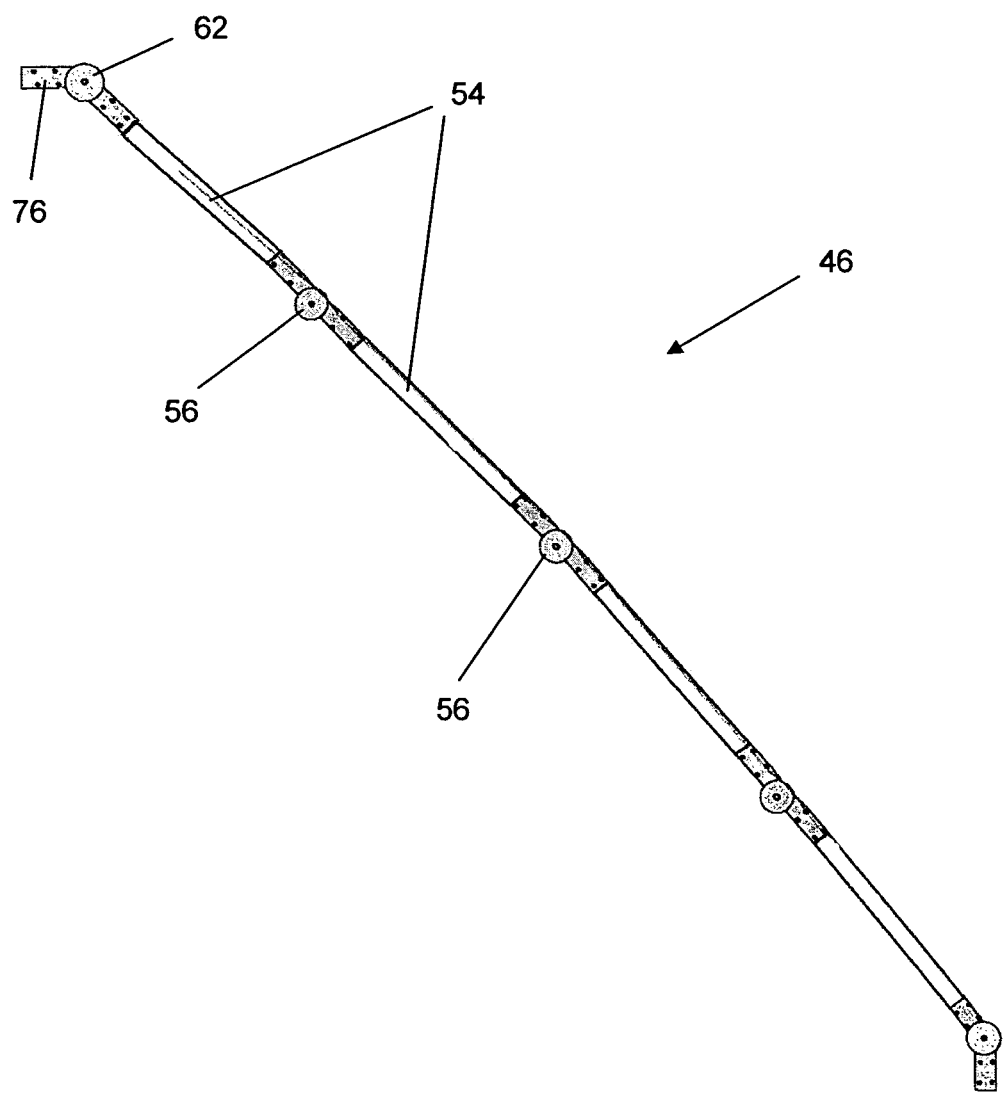
FIG. 6b is a top view of a roof assembly corner portion of the roof assembly of FIG. 5 shown in an expanded configuration.

To show more clearly the mechanism by which the corner roof assembly 46 moves between the retracted and expanded configuration, reference is now made to FIGS. 6A and 6B. FIG. 6A shows the corner roof assembly portion 46 in the retracted configuration. From FIG. 6A it is apparent that when the corner roof assembly portion 46 is in the retracted configuration it is folded about hinge portions 56 so that at least some elongate support members 54 are substantially adjacent one another in a lengthwise orientation. In this manner the corner roof assembly portion 46 may take up less space then if it was in an unfolded expanded configuration. Each hinge assembly 56, 62 comprises two coupling elements 76, in this case a sleeve, for receiving respective elongate support members 54.

Referring now to FIG. 6B there is shown the corner roof assembly portion 46 in the expanded configuration. In this configuration the elongate support members 54 are substantially linearly arranged and the spring loaded hinge assemblies 56 are locked in place. Each hinge assembly 62 arranged at each end of the corner roof assembly portion 46 is a free moving hinge however the free coupling elements 76 of each hinge assembly 62 would be, in use, coupled to respective side roof assembly portions 44 thereby maintaining the corner roof assembly portion 46 in the expanded configuration.

Figure 7:
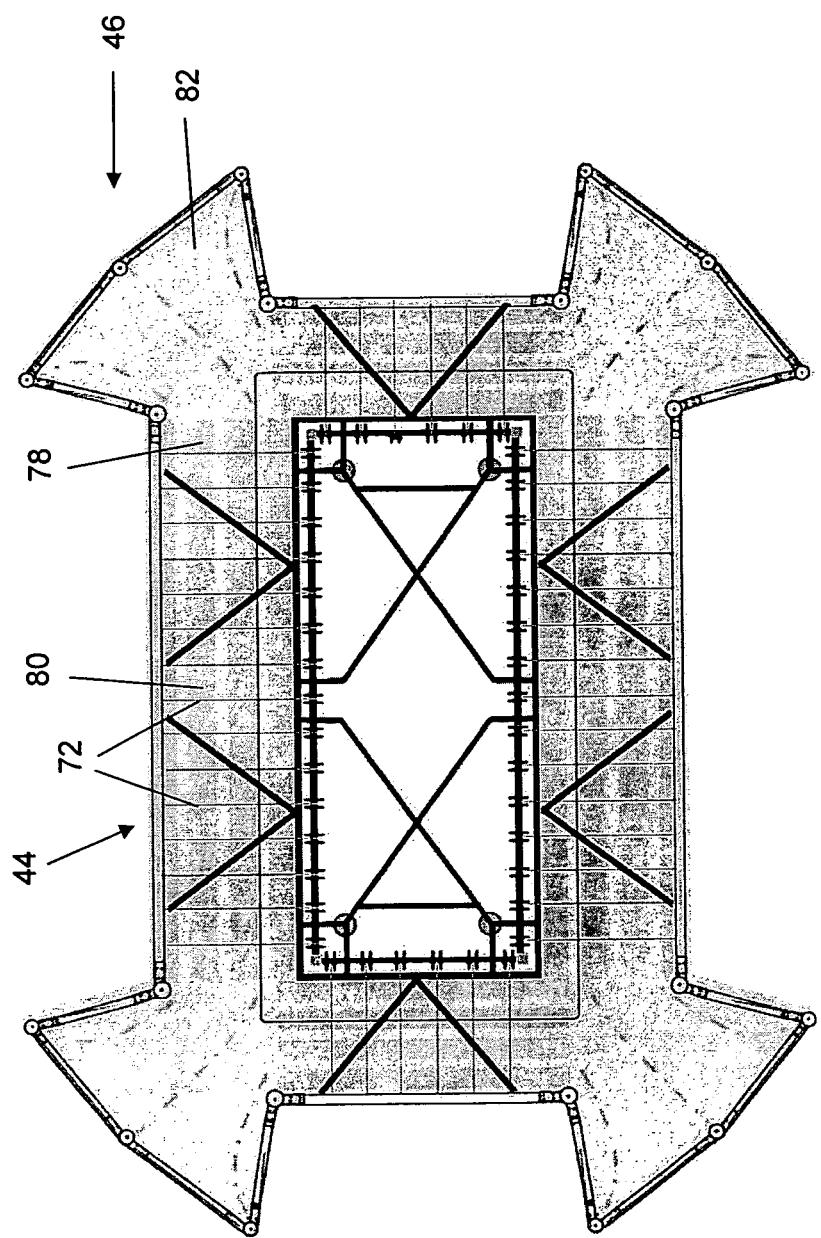
FIG. 7 is a cutaway view of the trailer of FIG. 1 showing the roof assembly in a semi expanded configuration and having a layer portion attached thereto.

Referring now to FIG. 7 there is shown the roof assembly 40 arranged in the same configuration as that shown in FIG. 5B but showing a layer of fabric portion 78 expanding or unfolding as the roof assembly 40 moves from the retracted to the expanded configuration. The layer or fabric portion 78 may be a continuous piece of fabric or it may comprise sections that are attached to one another so as to form a continuous layer of fabric portion 78. In the example shown in FIG. 7 the layer or fabric portion 78 comprises a side layer portion 80 corresponding to a respective side roof assembly portion 44 and a corner fabric portion 82 corresponding to a respective corner roof assembly portion 46.

In this example the side layer portion 80 is attached to respective cables 72 and takes the form of a folded fabric such as a Holland blind which will unfold as the respective side roof assembly portion 44 expands in a direction away from the support structure 42. The corner layer portion 82 may be attached to the elongate support structures 54 in a manner such that the corner layer portion 82 unfolds as the corner roof assembly portion 46 expands in conjunction with the side roof assembly portions 44.

Figure 8A:
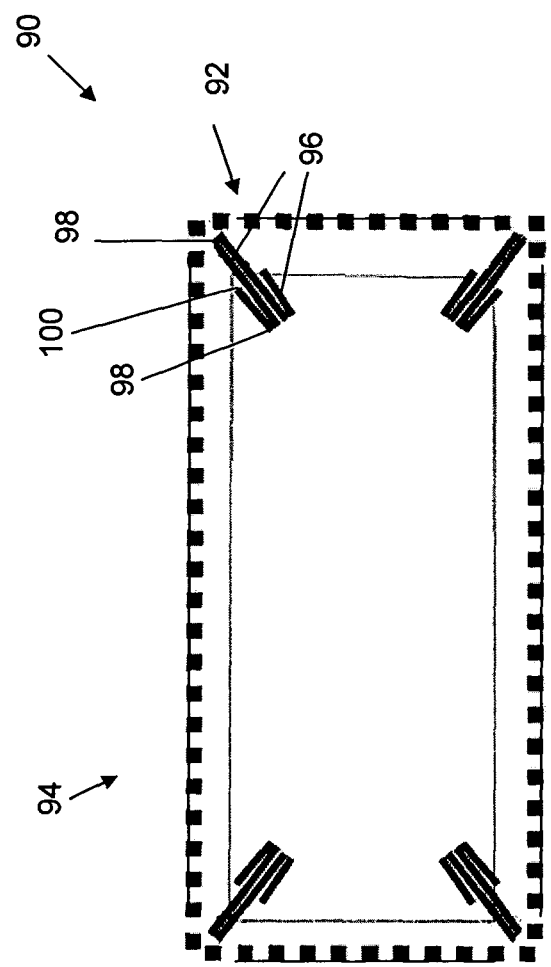
FIG. 8a is a cutaway top view of the trailer of FIG. 1 showing an alternative roof assembly in a retracted configuration.
Figure 8B:
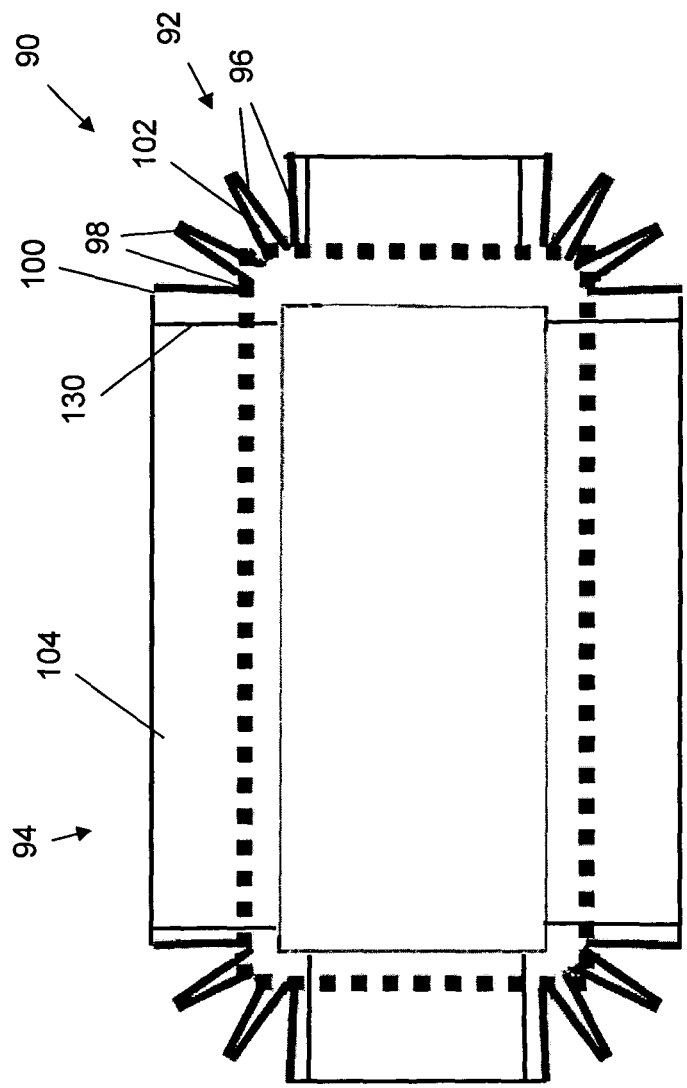
FIG. 8b is a cutaway top view of the trailer of FIG. 1 showing the alternative roof assembly in a partially expanded configuration.
Figure 8C:
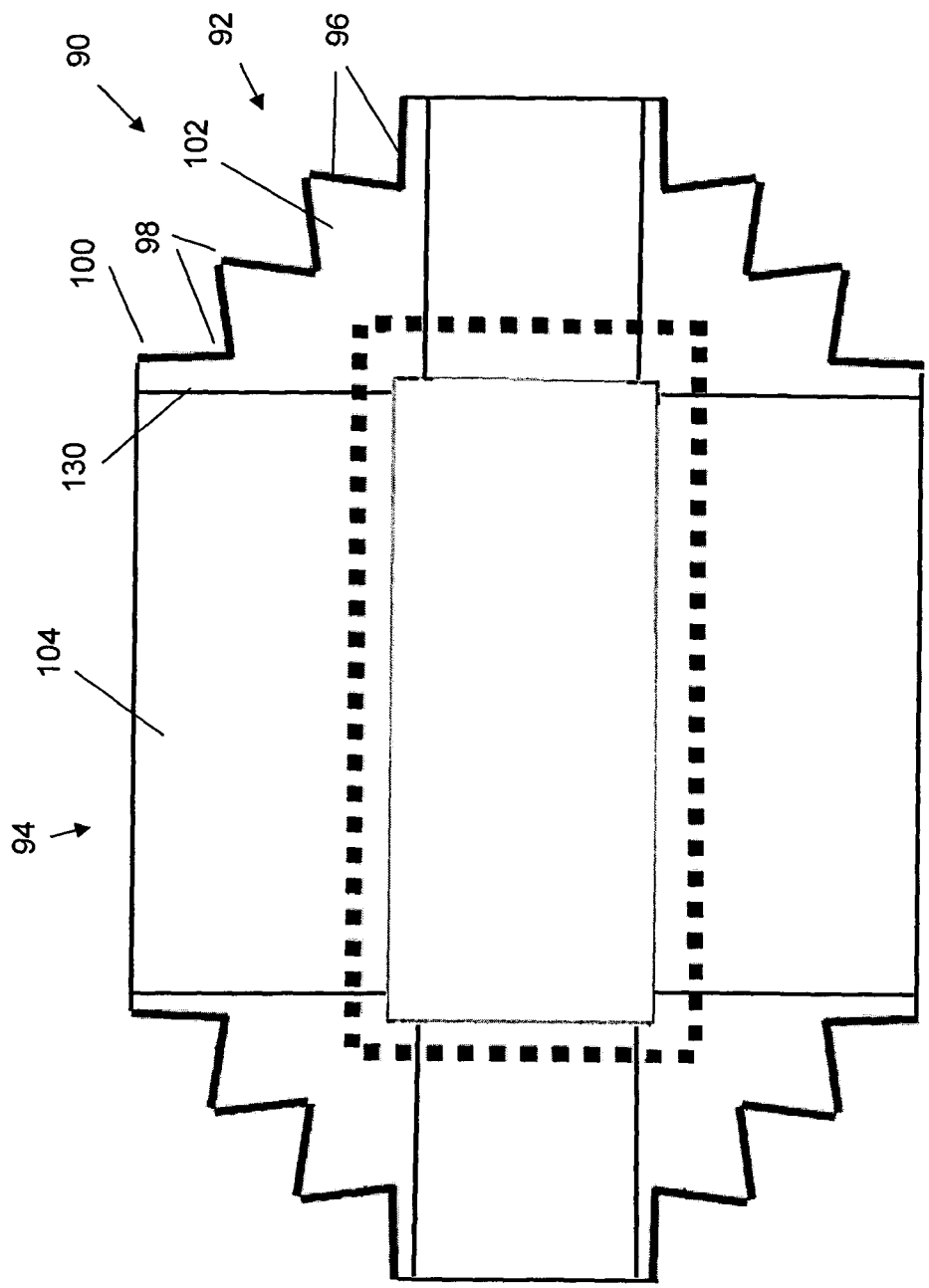
FIG. 8c is a cutaway top view of the trailer of FIG. 1 showing the alternative roof assembly in a partially expanded configuration.
Figure 8D:
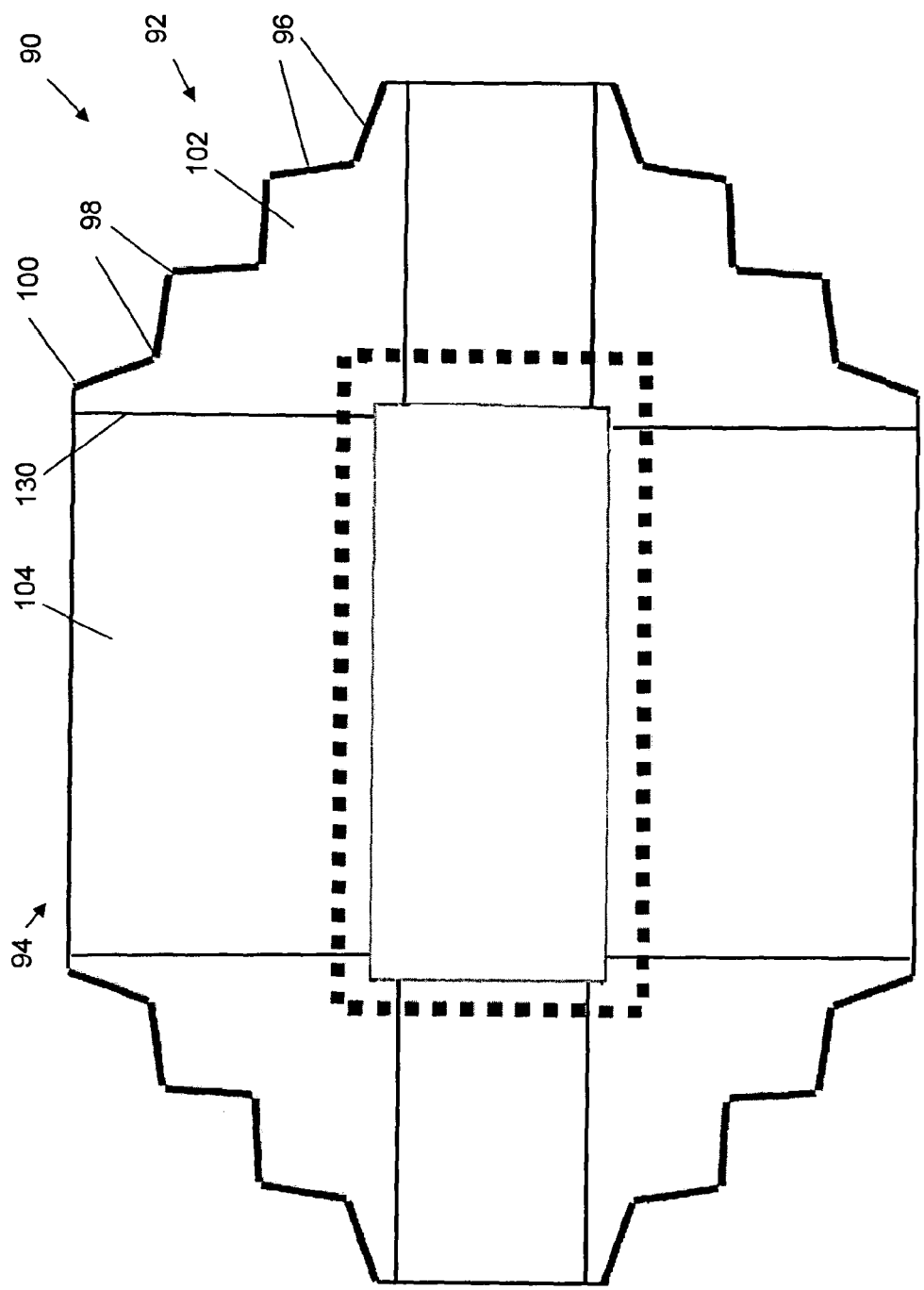
FIG. 8d is a cutaway top view of the trailer of FIG. 1 showing the alternative roof assembly in a partially expanded configuration.

An alternative mechanism for allowing a corner roof assembly to move between a retracted and an expanded configuration will now be described with reference to FIGS. 8A to 8E. FIG. 8A shows an alternative roof assembly 90 in a retracted configuration, with FIGS. 8B to 8D showing intermediate configurations as the roof assembly 90 moves to an expanded configuration shown in FIG. 8E.

The roof assembly 90 comprises a plurality of corner roof assembly portions 92 with side roof assembly portions 94 arranged therebetween. The side roof assembly portions 94 each support a side roof layer portion 104, and each corner roof assembly portion 92 supports a corner roof layer portion 102.

Each corner roof assembly portion 92 comprises a plurality of elongate support elements 96 hingedly coupled to one another by hinge members 98. The manner in which the support elements 96 are hingedly coupled to one another allows the corner roof assembly to fold in a concertina or zigzag like manner.

In this example, hinge members 98 are spring tensioned knuckle joint hinge mechanisms. Further hinge members 100 are provided on outer ends of outer support elements 96 for coupling to adjacent side roof assembly portions 94.

Figure 8E:
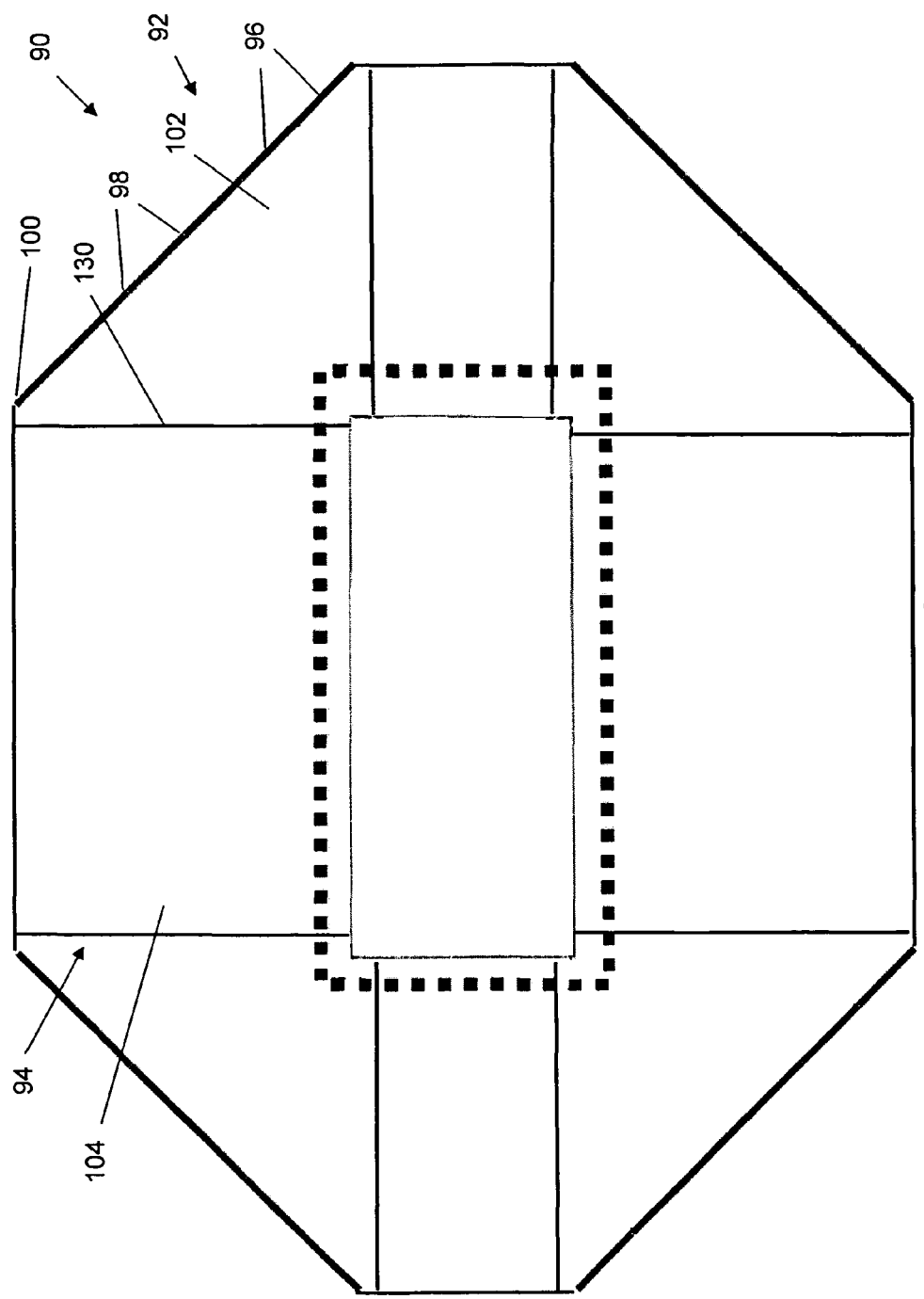
FIG. 8e is a cutaway top view of the trailer of FIG. 1 showing the alternative roof assembly in an expanded configuration.

The corner roof assembly 92 can move from the retracted configuration of 8A to an expanded configuration of FIG. 8E according to the sequence shown in FIGS. 8A to 8E. The concertina-like manner in which the support elements 96 can fold relative to one another allows the corner roof assembly portion 92 to move between the retracted and expanded configurations in such a way that the corner roof layer portion 102, such as the fabric layer portion described with reference to corner roof assembly portion 46, coupled to the corner roof assembly portion 92 will not be stretched beyond a certain limit. It will be appreciated that the amount that the corner roof layer portion 102 can stretch will depend on the material used. Examples of such materials are described in more detail later.

An alternative roof assembly portion 110 is shown in FIGS. 9A to 9E. The roof assembly portion 110 comprises a plurality of corner roof assembly portions 112 with side roof assembly portions 114 arranged therebetween. The side roof assembly portions 114 each support a side roof layer portion 124, and each of the corner roof assembly portions 112 support a corner roof layer portion 122.

The roof assembly portion 110 is generally similar to the roof assembly portion 90 of FIGS. 8A to 8E, each corner roof assembly portion 112 comprising a plurality of elongate support elements 116, hingedly coupled to one another by hinge members 118. The main difference between the corner roof assembly portions 112 and the corner roof assembly portions 92 is that the corner roof assembly portions 112 have a curved outer edge when in the expanded configuration.

In the example shown in FIGS. 9A to 9E, the corner roof assembly portion 112 attains its curved shape by having substantially linear support members 116 and providing hinge members 118 that flex in such a way that the angles between adjacent support members 116 are less than 180°, which results in an overall curved outer edge of the corner roof assembly portion 112 when in the expanded configuration. In an alternative embodiment (not shown), the support members may have a curved profile, and the hinge members 118 may flex in such a way so as to form a substantially 180° angle between adjacent support members 116.

It will be appreciated that the curvature may be achieved by any other appropriate means, or a combination of the aforementioned means.

Figure 9A:
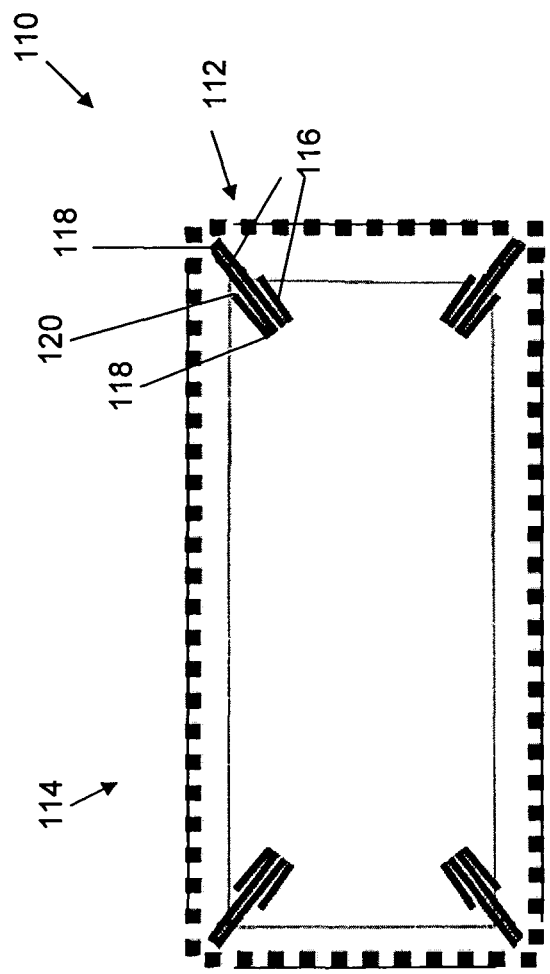
FIG. 9a is a cutaway top view of the trailer of FIG. 1 showing an alternative roof assembly in a retracted configuration.
Figure 9B:
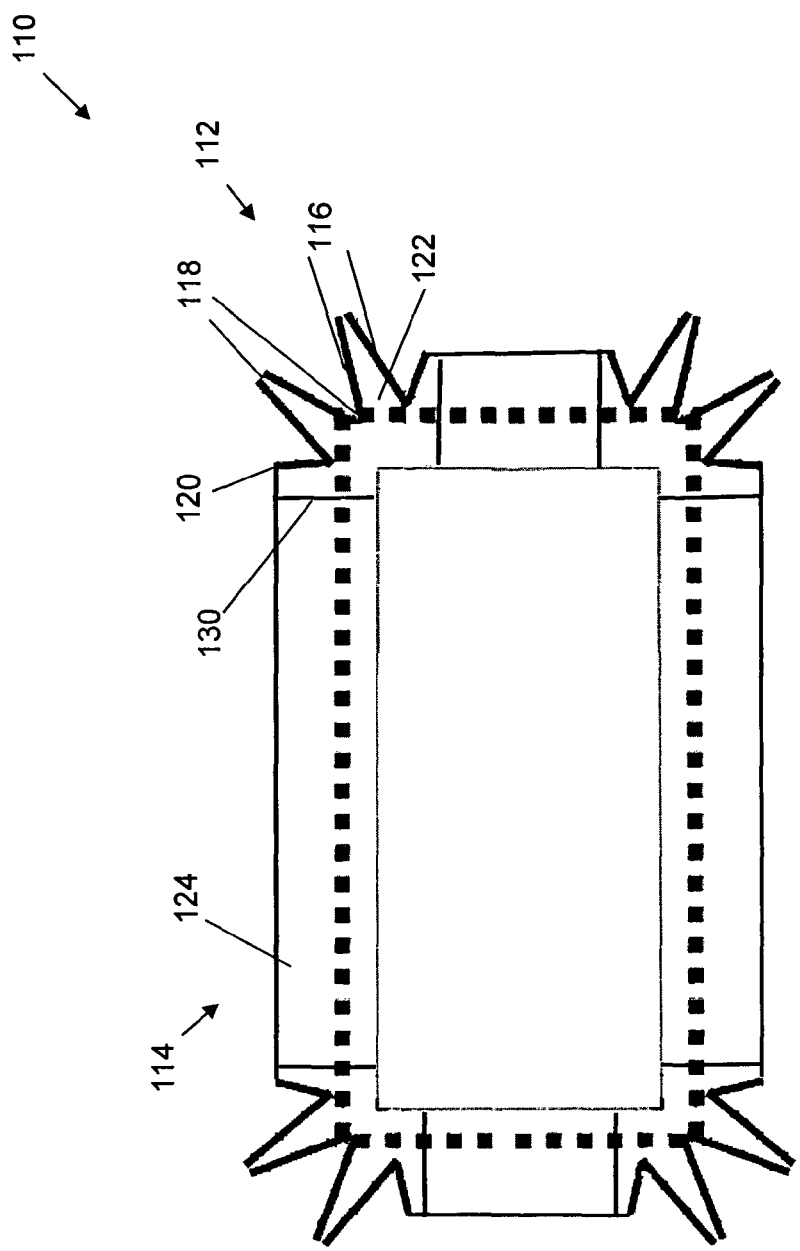
FIG. 9b is a cutaway top view of the trailer of FIG. 1 showing the alternative roof assembly in a partially expanded configuration.
Figure 9C:
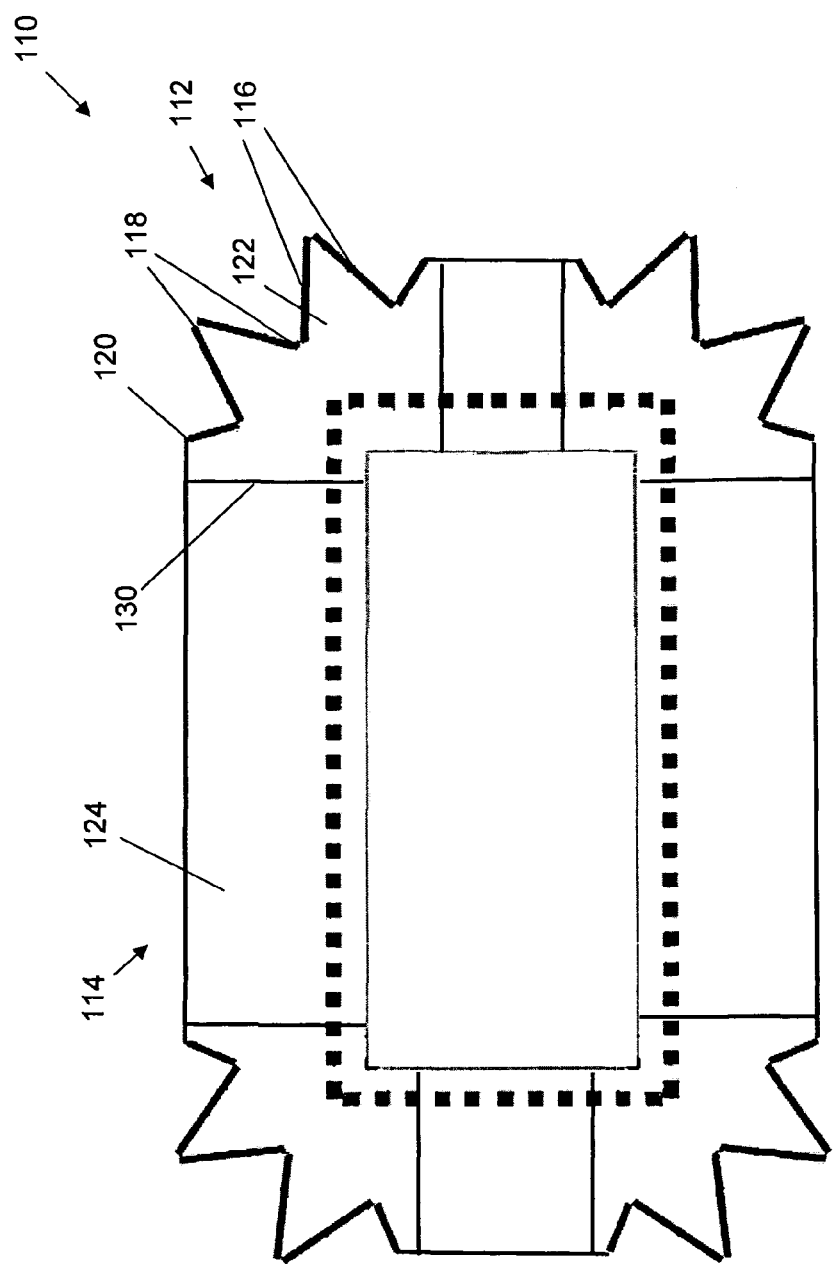
FIG. 9c is a cutaway top view of the trailer of FIG. 1 showing the alternative roof assembly in a partially expanded configuration.
Figure 9D:
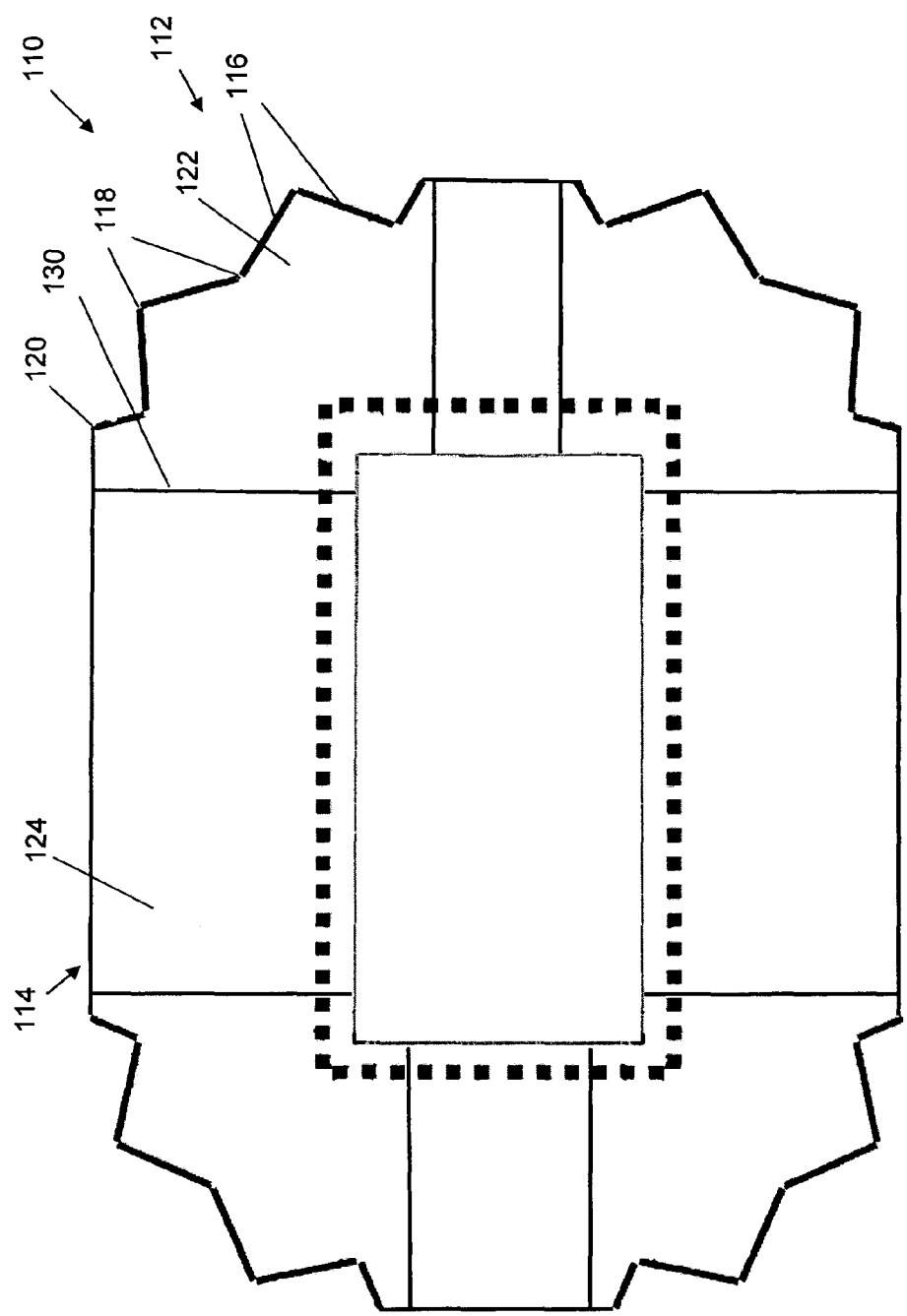
FIG. 9d is a cutaway top view of the trailer of FIG. 1 showing the alternative roof assembly in a partially expanded configuration.
Figure 9E:
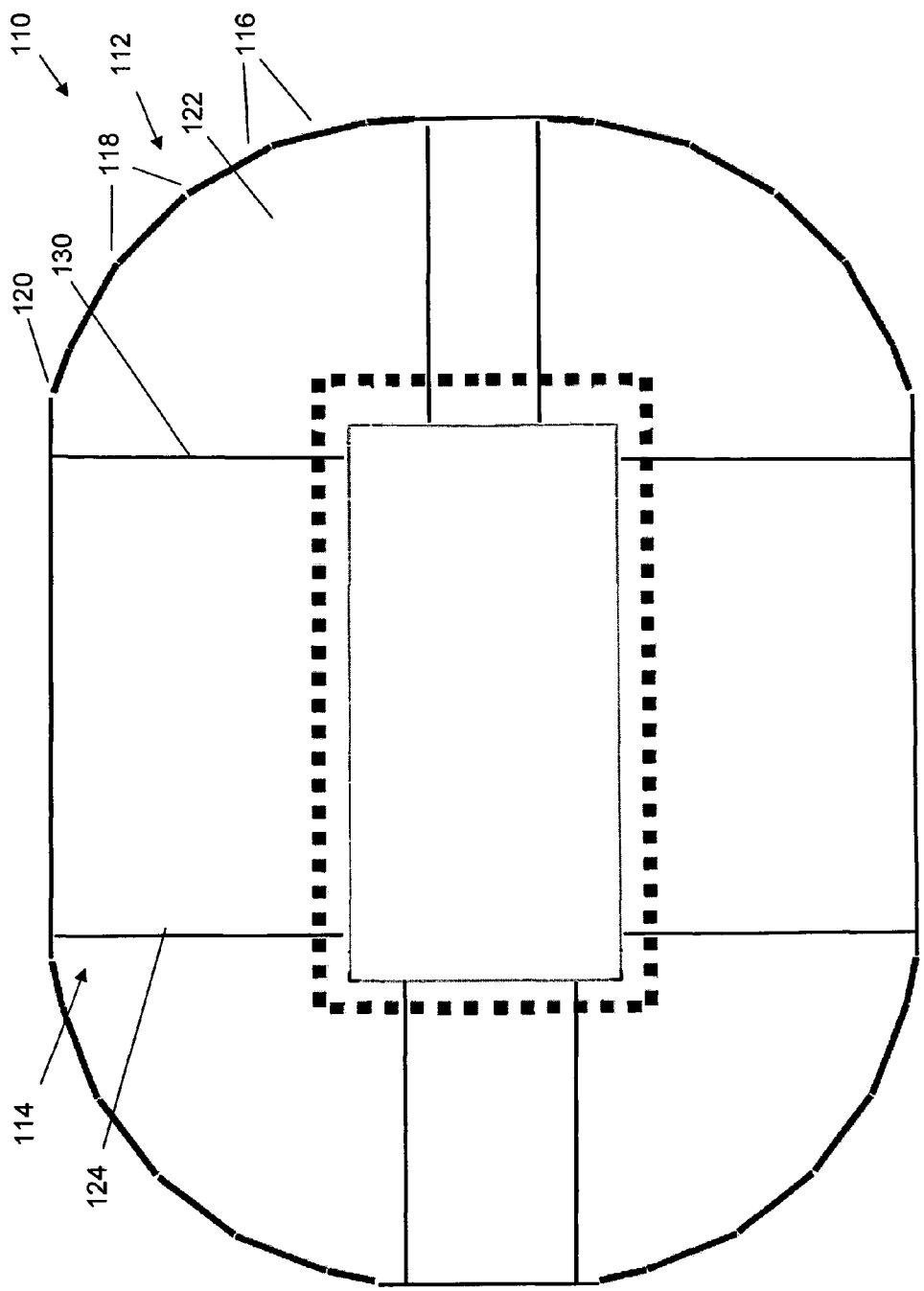
FIG. 9e is a cutaway top view of the trailer of FIG. 1 showing the alternative roof assembly in an expanded configuration.

Referring now to FIG. 10A, there is shown a partial cross section of the side roof assembly portion 114 of FIG. 9A, the roof assembly 90 being in the retracted configuration. It will be appreciated that the cross section may also represent a partial cross section of the side roof assembly portions 94 of FIG. 8A, or the side roof assembly portions 44 of FIG. 5A.

FIG. 10A shows the side roof layer portion 124 folded in a concertina-like manner. The side roof layer portion 124 is coupled at a first end 126 to a roof assembly support 127 and at a second end 128 to a telescopic arm 130.

The telescopic arm 130 is extendable in a manner similar to that described previously, however in this example the telescopic arm 130 moves substantially perpendicularly to the edge of the side roof assembly portion 114.

The side roof layer 124 will fold out as the telescopic arm 130 is extended until the configuration shown in FIG. 10B is achieved. Support for the side roof layer 124 is provided in this example by support rods 132.

The side roof layer portion 124 can then be retracted using a winch 134 that is connected to the side roof layer portion 124 by cable 136. This will allow the side roof layer portion 124 to return to the folded configuration shown in FIG. 10A.

In this example, the side roof layer portion 124 moves from the retracted configuration of FIG. 10A to the expanded configuration shown in FIG. 10B due to the extension of the telescopic arm 130 and the coupling between the side roof layer portion 124 and the telescopic arm 130. The side roof layer portion 124 moves from the expanded configuration of FIG. 10B to the retracted configuration of FIG. 10A due to the retraction of the cable 136, and its coupling to the side roof layer portion 124.

A similar concertina-like folding of the corner roof layer portions 102, 122 may also be used for the corner roof assembly portions 92, 112, along with the winch and cable means to assist with retracting the corner roof assembly portions 102, 122. In these examples the corner roof assembly portions 102, 122 move to the expanded configurations due to their respective couplings to the telescopic arms 130.

The material used for the side and corner roof layer portions 102, 104, 122, 124 will now be described.

The side and corner roof layer portions will preferably comprise materials commonly referred to as architectural fabrics. These types of materials are appropriate for use with permanent tensile structures, and with temporary structures such as tents and marquees.

In this example, the material is a layered polymeric material, such as a polyester material coated with a polyvinyl chloride (PVC) and/or a polyvinylidene fluoride (PVDF) material. In one example, the material comprises a polyester woven scrim core sandwiched between PVC layers. The polyester scrim and PVC layers are themselves sandwiched between acrylic lacquer layers. The material may further comprise a top layer of PVDF lacquer layer and a further fluorine lacquer layer.

Irrespective of the actual material used, it is desirable that the properties of the material allow it to be folded when the roof assembly is in the retracted configuration in the manner described in the preceding description, and to provide sufficient protection from the elements when the roof assembly is in the expanded configuration.

Means for increasing the amount of protection that can be provided by the roof assemblies 40, 90, 110 will now be described.

Figure 11A:
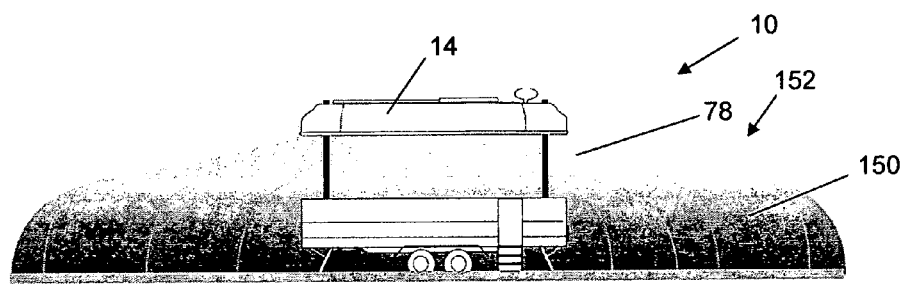
FIG. 11a is a side elevation of the trailer of FIG. 1 in an expanded configuration showing additional roof portions and wall portions attached to the expanded roof assembly.
Figure 11B:
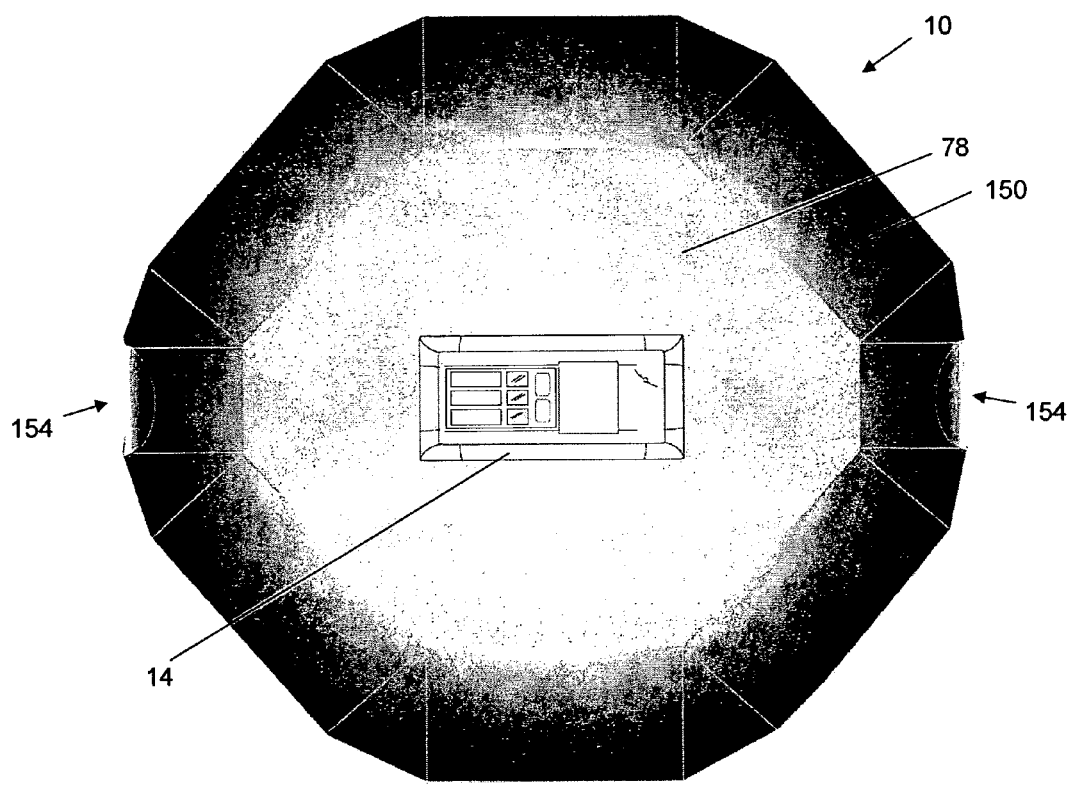
FIG. 11b is a top view of the trailer of FIG. 1 in an expanded configuration showing additional roof portions and wall portions attached to the expanded roof assembly.

Referring now to FIGS. 11A and 11B, there is shown the trailer 10 with the roof portion 12 in a raised configuration and showing the roof assembly 40 in an expanded configuration such that the layer portion 78 extends from the upper portion 14 to provide shelter. It will be appreciated that the roof assembly described may also be the roof assemblies 90 or 110 of FIGS. 8 and 9 respectively.

The layer portion 78 is supported by the roof assembly 40 so as to be free standing. Optionally, additional supports may be attached to the layer portion 78 so as to provide a more stable structure about which more cover or layer portions may be added. For example, and as shown in FIGS. 11A and 11B, an additional layer portion 150 has been added to the layer portion 78 so as to form a marquee 152 having openings 154. A number of such marquees 152 may be formed in this manner and joined to one another via the openings 154 so as to form modularly expandable shelters. Joining marquees 152 together via the openings 154 provides the further advantage of providing continuous shelter between the joined marquees 152.

Figure 12A:
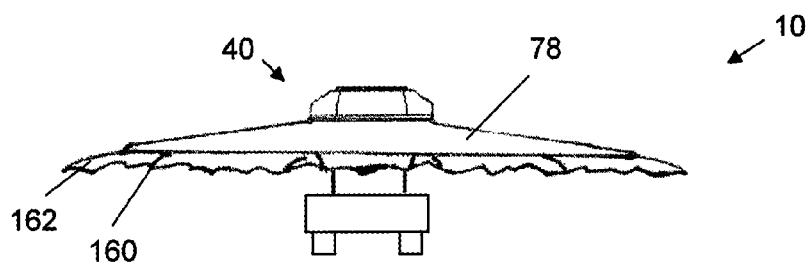
FIG. 12a is a front elevation of the trailer of FIG. 1 showing the roof assembly expanding.
Figure 12B:
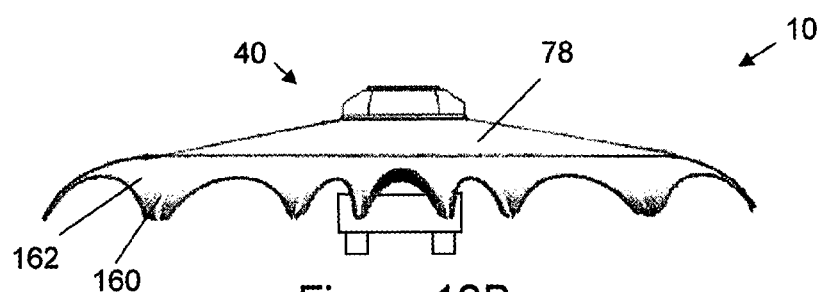
FIG. 12b is a front elevation of the trailer of FIG. 1 showing the roof assembly expanding.
Figure 12C:
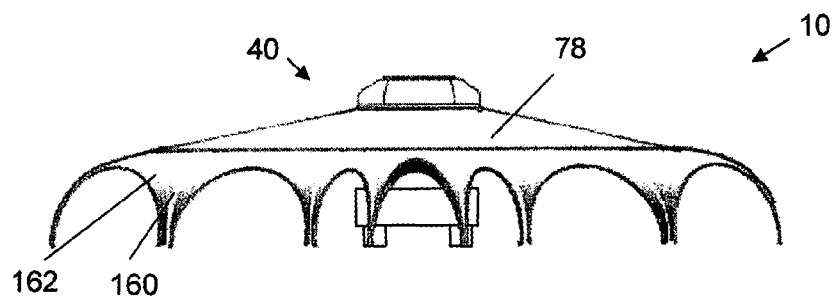
FIG. 12c is a front elevation of the trailer of FIG. 1 showing the roof assembly in the expanded configuration.

Another example of increasing the amount of protection provided by the roof assemblies 40, 90, 110 is shown in FIGS. 12A to 12C. In this example, the side and corner roof assembly portions 44, 46 house extendable support legs 160 and additional layer portions 162. The additional layer portions 162 are attached to the support legs 160 such that extension of the support legs 160 will also cause the additional layer portions 162 to unfold and wherein the support legs 160 support the additional layer portions 162.

Figure 13A:
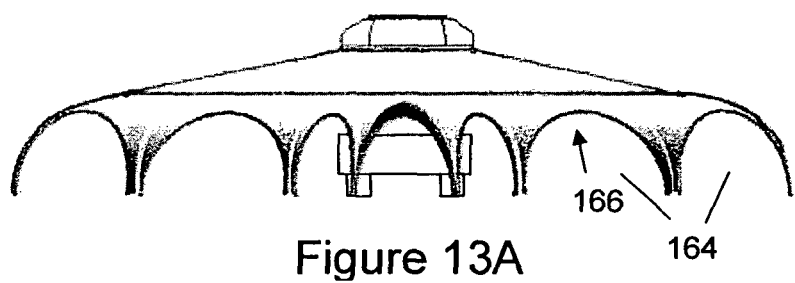
FIG. 13a is a front elevation of the trailer of FIG. 1 showing the roof assembly in the expanded configuration.
Figure 13B:
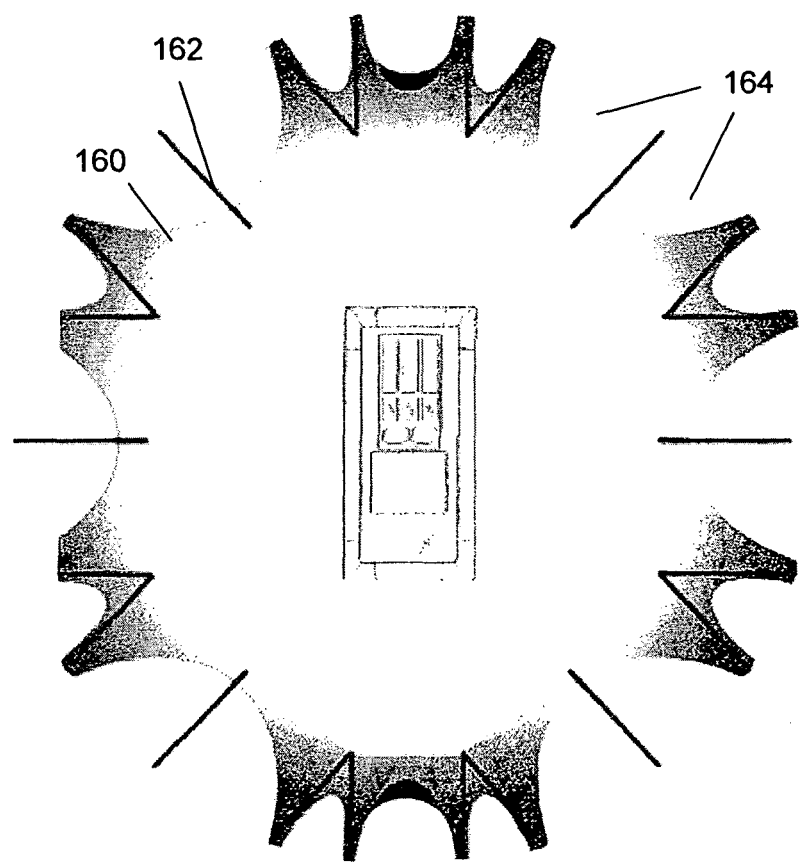
FIG. 13b is a top view of the trailer of FIG. 1 showing the roof assembly in the expanded configuration.
Figure 14A:
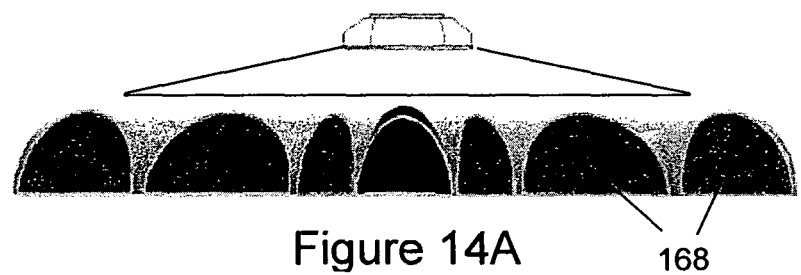
FIG. 14a is a front elevation of the trailer of FIG. 1 showing the roof assembly in the expanded configuration.
Figure 14B:
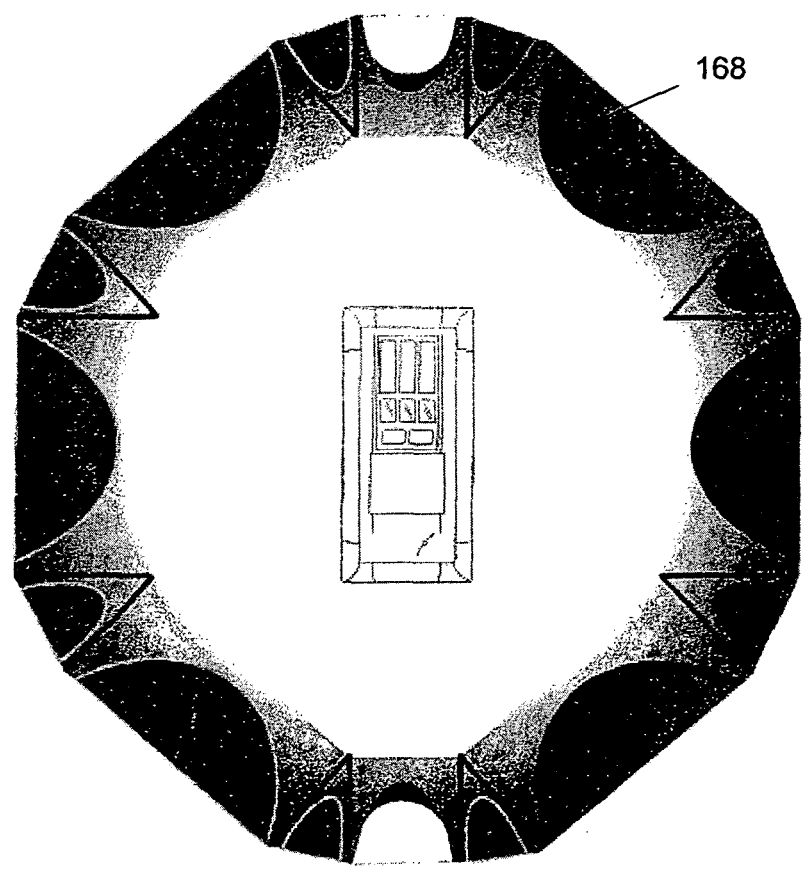
FIG. 14b is a top view of the trailer of FIG. 1 showing the roof assembly in the expanded configuration.

In this way, the legs 160 can be extended in the sequence shown in FIGS. 12A to 12C such that the additional cover extends with the legs 160. Once the support legs 160 and the additional layer portions 162 have been fully deployed to an expanded configuration shown in FIG. 13, further material 168 can be unfurled to cover openings 164 formed by the support legs 160 and additional layer portions 162. In this example, the further material 168 (see FIG. 14) is housed in a zip compartment at an edge 166 of the additional layer portions 162 in a manner similar to scallop tent openings. The further material 168 can be zipped closed so as to fully close openings 164 if desired as shown in FIG. 14.

Although the above example describes telescopically extendable support legs 160, the support legs 160 may alternatively be foldable, and it will be appreciated that any appropriate means for extending the protection provided by the roof assembly 40 may be used.

Numerous variations and modifications will suggest themselves to persons skilled in the relevant art, in addition to those already described, without departing from the basic inventive concepts. All such variations and modifications are to be considered to be within the scope of the present invention, the nature of which is to be determined from the foregoing description.

For example, although the forgoing description relates to a trailer, it will be appreciated that the roof assembly may be used in conjunction with, or installed in, a fixed structure or a semi-permanent structure such as a demountable structure.

Further, it will be appreciated that the trailer, or any such structure associated with the roof assembly, may be used for many and varied purposes including, but not limited to: medical clinics; animal clinics; mobile film units; military enclosures; survey teams such as geological surveyors; rally and other motor sport support teams; catering purposes, kitchens and mobile restaurants; expositions; and other situations where a mobile shelter and/or a conveniently deployable shelter is required.

Still further, it will be appreciated that the roof assembly may be arranged so as to provide only a portion of coverage around the structure. For example, the roof assembly may be arranged so as to provide 180° of shelter around the structure in situations where such coverage is desired. Such a situation may include a sound stage or other performing stage setup wherein the coverage provides shelter for performers, technicians and equipment in a backstage area.

In the claims which follow and in the preceding description of the invention, except where the context requires otherwise due to express language or necessary implication, the word "comprise" or variations such as "comprises" or "comprising" is used in an inclusive sense, i.e. to specify the presence of the stated features but not to preclude the presence or addition of further features in various embodiments of the invention.

The invention claimed is:

1. A roof assembly for covering a region adjacent a structure, the roof assembly comprising:
a plurality of roof assembly portions, each roof assembly portion comprising a layer portion and a support portion for supporting the layer portion; the roof assembly portions comprising first and second side roof assembly portions and a corner roof assembly portion that is positioned between the first and second side roof assembly portions; the roof assembly portions being moveable between a retracted and an expanded configuration and arranged such that the side roof assembly portions and the corner roof assembly portion move together between the retracted and expanded configurations; wherein
the support portions of each roof assembly portion have first and second end-portions, at least one end-portion being coupled to a respective first or second end-portion of a support portion of an adjacent roof assembly portion so as to form a series of the support portions.

2. The roof assembly of claim 1, wherein the first and second side roof assembly portions are positioned immediately adjacent the corner roof assembly portion.

3. The roof assembly of claim 1, wherein the roof assembly is arranged so that an outer periphery of the support portions surrounds at least a portion of the structure when the roof assembly is in the expanded configuration.

4. The roof assembly of claim 1, wherein the roof assembly is configured such that each one of a plurality of side roof assembly portions is associated with a side of the structure and corner roof assembly portions are arranged between, and coupled to, adjacent side roof assembly portions so as to provide a continuous roof assembly having an outer periphery capable of surrounding the structure when the roof assembly portions are in the expanded configuration.

5. The roof assembly of claim 1, wherein the roof assembly is expandable in one action so as to cover a continuous region surrounding the structure.

6. The roof assembly of claim 1, wherein the support portion of the first and second side roof assembly portions comprises elongate members that extend substantially along the respective side roof assembly portions.

7. The roof assembly of claim 6, wherein each elongate member comprises a series of member portions.

8. The roof assembly of claim 6, wherein the support portion of the corner roof assembly portion is foldable, having a first coupling coupled to an end of the elongate member of the first side roof assembly portion and a second coupling coupled to an end of the elongate member of the second side roof assembly portion so as to allow the corner roof assembly portion to move in conjunction with the first and second side roof assembly portions.

9. The roof assembly of claim 8, wherein the foldable support portion of the corner roof assembly portion comprises a plurality of elongate support elements sequentially coupled to one another in a manner such that, when the corner roof assembly portion is in the retracted configuration, at least a portion of the support portion of the corner roof assembly portion is folded about a coupling between the support elements.

10. The roof assembly of claim 8, wherein the foldable support portion of the corner roof assembly portion is foldable in a concertina or zigzag like manner as the corner roof assembly portion moves to the retracted configuration.

11. The roof assembly of claim 6, wherein the roof assembly comprises telescopic members that are coupled to respective elongate members so that, as the telescopic members move, the elongate members move in a manner such that the roof assembly moves between the retracted and expanded configurations.

12. The roof assembly of claim 1, wherein the roof assembly comprises additional roof portions and/or wall portions that are arranged for coupling to the roof assembly when in the expanded configuration.

13. The roof assembly of claim 1, comprising extendable support legs and wherein the extendable support legs can be extended from the side and corner roof portions to provide a frame for additional layer portions.

14. An expandable structure comprising a base portion, an upper portion coupled to the base portion and comprising a roof assembly, the roof assembly in accordance with claim 1; wherein
the upper portion is moveable between a lowered configuration and a raised configuration so as to allow the expandable structure to be expandable in a substantially vertical direction.

15. The expandable structure of claim 14, wherein the roof assembly is moveable between a contracted and an expanded configuration so as to provide an expandable roof.

16. The expandable structure of claim 14, wherein the upper portion provides cover for the expandable structure and the roof assembly provides shelter for a region external the expandable structure when the roof assembly is in the expanded configuration.

17. The expandable structure of claim 14, wherein the upper portion is arranged so as to house the roof assembly when in the contracted configuration and to which the roof assembly is attached when expanded.

18. A vehicle comprising
a roof assembly, the roof assembly being arranged to be moveable between a retracted and an expanded configuration in one action such that, when the roof assembly is in the expanded configuration, an outer periphery of the roof portion surrounds the vehicle, wherein the vehicle comprises an upper portion comprising the roof assembly portion, and the upper portion is moveable between a lowered and a raised configuration.

19. The vehicle of claim 18, wherein the roof assembly is in accordance with claim 1.

* * * * *